United States Patent
Tidcomb

[19]

[11] Patent Number: 6,158,757
[45] Date of Patent: Dec. 12, 2000

[54] MOTION CONVERSION ASSEMBLY AND VEHICLE

[76] Inventor: Steven Tidcomb, Four Laurel St., Beverly, Mass. 01915-1236

[21] Appl. No.: 09/122,543

[22] Filed: Jul. 24, 1998

Related U.S. Application Data

[60] Provisional application No. 60/053,676, Jul. 24, 1997.

[51] Int. Cl.[7] ............................... B62M 1/14; F16D 1/00
[52] U.S. Cl. ...................... 280/250.1; 280/244; 403/325
[58] Field of Search .................................... 280/233, 251, 280/253, 242.1, 243, 304, 244, 250.1; 180/907; 403/321, 322.1, 322.4, 324, 325

[56] References Cited

U.S. PATENT DOCUMENTS

| | | |
|---|---|---|
| 3,760,905 | 9/1973 | Dower . |
| 3,994,509 | 11/1976 | Schaeffer ................................ 280/243 |
| 4,113,221 | 9/1978 | Wehner ................................... 403/324 |
| 4,379,566 | 4/1983 | Titcomb . |
| 4,453,729 | 6/1984 | Lucken ................................... 280/253 |
| 4,518,002 | 5/1985 | Battiston, Sr. et al. ................ 403/325 |
| 4,560,181 | 12/1985 | Herron ................................... 280/244 |
| 4,762,332 | 8/1988 | Seol . |
| 4,811,964 | 3/1989 | Horn . |
| 4,840,076 | 6/1989 | Brubaker et al. . |
| 4,865,344 | 9/1989 | Romero et al. . |
| 5,007,655 | 4/1991 | Hanna ................................... 280/250.1 |
| 5,020,815 | 6/1991 | Harris et al. . |
| 5,184,837 | 2/1993 | Alexander ............................ 280/242.1 |
| 5,242,179 | 9/1993 | Beddome et al. . |
| 5,429,379 | 7/1995 | Grigoriev ................................ 280/233 |
| 5,590,893 | 1/1997 | Robinson et al. .................... 280/250.1 |
| 5,941,547 | 8/1999 | Drake .................................... 280/242.1 |
| 6,007,082 | 12/1999 | Watwood et al. ...................... 280/244 |

*Primary Examiner*—J. J. Swann
*Assistant Examiner*—Christopher D Bottorff
*Attorney, Agent, or Firm*—O'Connell Law Firm

[57] ABSTRACT

An occupant-propelled vehicle comprising a vehicle body and a first vehicle propulsion system that comprises a first drive wheel, a drum rotatably coupled to the vehicle frame and drivingly engaged with the drive wheel, a movable force receiver, an elongated and flexible motion conversion member drivably coupled with the force receiver with a first reference point spaced a given effective-travel distance from a second reference point and a body portion overlying the drum, and an actuator mechanism for actuating the motion conversion member between a slackened, disengaged state and a tensioned state wherein there is frictional engagement between the drum and the motion conversion member. The actuator mechanism may be automatic or manual.

29 Claims, 15 Drawing Sheets

MOTION CONVERSION ASSEMBLY AND VEHICLE

This application claims benefit to Provisional Application 60/053,676 filed Jul. 24, 1997.

FIELD OF THE INVENTION

The present invention relates generally to motion conversion devices. More particularly, the invention relates to an assembly for converting motion between reciprocating and rotary forms and to occupant-propelled vehicles employing such an assembly for propulsion and, possibly, steering and braking.

BACKGROUND OF THE INVENTION

Efficiently converting motion from one form to another is an age-old challenge that is relevant to many areas of technology. One may consider it to be particularly relevant to the drive systems of occupant-propelled vehicles. For example, traditional wheel chairs have been crafted to be propelled by an occupant's rotating a circular rim, by a motor, and by a second person. However, needs of certain users and deficiencies in prior art systems have given rise to lever drive systems that make more efficient use of an occupant's input force than such systems as circular rims. Consequently, a number of attempts have been made to provide an improved means for converting the oscillating motion of a pivoting lever to a rotary motion of a drive wheel of the chair.

Lever drive chairs have been patented with a unidirectional sprocket imparting rotary motion to the driving wheels of a chair by means of a chain. Others have been disclosed with drive systems incorporating relatively complex ratchet housing and gear arrangements. Another drive system taught by the prior art reveals a lever-actuated, rigid brake band means overlying a circumferential edge of a drum that is drivingly coupled to the driving wheels of the chair by a sprocket and chain combination. That drive system permits the selective driving and braking of the chair by a pivoting of the rigid lever actuator.

Notwithstanding the unchallenged usefulness of the foregoing inventions, such occupant-propelled vehicles with their motion conversion assemblies have left a multiplicity of deficiencies in the art. Among them is the fact that the prior art devices often require a relatively large number of parts such as gears, sprockets, chains, and the like that incidentally increases the cost of manufacturing the devices and the likelihood of mechanical malfunction. Furthermore, prior art systems have been known to be excessively heavy. Also, they do not address many biomechanical needs of a user such as the need for allowing a user's arm to follow an optimal path over a full power stroke and the need to accommodate the varying muscular force that a user typically is able to apply. Still further, prior art assemblies either have not permitted a user to shift the propulsion system's gearing or they have made it disadvantageously difficult to do. Additionally, prior art systems have not been truly portable because they employ standard, relatively large wheel chair wheels that cannot easily be released and removed. Yet further, most prior art motion conversion assemblies do not permit an adjustment of the wheel chair seat height, and they restrict the ability of an occupant to transfer into and out of the chair. Further yet, many prior art systems impart a braking of the chair when a user pushes the drive lever to a most-forward position of the power stroke such that a user must consciously limit a push of the lever and unexpected and dangerous braking is possible.

With these things in mind, it becomes clear that there is a need left by the prior art for a motion conversion assembly that is particularly useful with occupant-propelled vehicles that converts motion between reciprocating and rotary forms in an efficient and simple manner while potentially permitting a user to drive, brake, and steer the vehicle by a single means.

There is a further deficiency in the prior art relative to the steering of occupant-propelled vehicles such as wheel chairs. The problem is particularly prevalent with chairs propelled by a single-arm force receiver, such as a drive lever. Steering with such prior art devices has proven mechanically and functionally complex, commonly presenting users with an ergonomically unfriendly steering apparatus. For example, in some devices, a user is required to rotate a control grip about an axis that is generally perpendicular to the user's arm to rotate a caster wheel via a chain, joint, or lever connection. In some steering mechanisms of this type, the grip is longitudinally aligned with its axis of rotation. In others, the grip is perpendicular to its axis of rotation. In both arrangements, many find the required contortion of one's wrist and arm while expending a driving force upon a force-receiving lever difficult and uncomfortable. Furthermore, the steering direction inadvertently may be affected by one's exertion of a propelling force.

Similarly inefficient and uncomfortable are prior art steering devices that require a user to rotate a shovel type handle. Other steering systems include complex multi-gear force transmission arrangements, and prior art systems commonly do not provide a means for disengaging the steering controls to allow free motion of the caster as would be useful when the chair is to be pushed by a second person. In total, one sees that prior art devices are undesirably complex and uncomfortable to operate. Consequently, it would be advantageous if one were to provide a steering arrangement that is simple, effective, and durable while being comfortable to operate.

SUMMARY OF THE INVENTION

Advantageously, the present invention has as its principal object the provision of a simple yet effective system for converting motion between reciprocating and rotary forms.

Incidental objects of the motion conversion assembly are to employ the invention to propel and, possibly, brake and steer an occupant-propelled vehicle.

A still further object of the invention is to make a most efficient and comfortable use of a user's effort to propel a vehicle.

These and many other objects and advantages of the present invention will become obvious as one reads the present disclosure and reviews the accompanying figures.

In accomplishing the aforementioned objects, the motion conversion assembly of the present invention essentially comprises a movable force receiver for receiving an input force and moving over a power stroke; an elongate and flexible motion conversion member drivably coupled to the force receiver whereby an input force imparting movement to the force receiver imparts endwise, driven movement to the motion conversion member, the motion conversion member with a body portion between a first reference point that is spaced an effective-travel distance from a second reference point; and an actuator mechanism operably associated with the motion conversion member for selectively increasing the effective-travel distance between the first reference point and the second reference point thereby actuating the motion conversion member from a slackened, disengaged state to a tensioned, frictionally engaged state.

In one embodiment the actuator mechanism can adjust automatically the effective-travel distance between the first reference point and the second reference point at opposite ends of the power stroke of the force receiver. This automatic adjustment is carried out by a means for automatically decreasing the effective-travel distance between the first reference point and the second reference point when the motion conversion member has been reciprocatably driven a selected distance in a first direction to actuate the motion conversion member into a slackened, disengaged state and by a means for automatically increasing the effective-travel distance between the reference points when the motion conversion member has been reciprocatably driven a selected distance in a second direction to actuate the motion conversion member into a tensioned, frictionally engaged state.

Whether the actuator mechanism is automatic or not, the aforementioned motion conversion assembly is complete in the sense that it can convert a reciprocation of the motion conversion member to a rotary motion of a drum that the motion conversion member overlies when the motion conversion member is actuated from a disengaged state wherein there is free movement between the drum and the motion conversion member to a tensioned, frictionally engaged state wherein there is a lack of free movement between the drum and the motion conversion member.

To improve the wear and performance of the motion conversion assembly, a resiliently compressible clutch collar may be interposed between the motion conversion member and the drum whereby a tensioning of the motion conversion member will compress the clutch collar about the drum to create a frictional engagement between the motion conversion member and the drum.

Advantageously, as will be set forth more particularly below, the preferred construction of the clutch collar ensures that there is substantially no frictional contact between the clutch collar and the drum when the motion conversion member is not tensioned such as during a return stroke of the force receiver or during coasting. Optimally, the force receiver may be drivingly coupled to a first end and also to a second end of the motion conversion member whereby the force receiver may impart bi-directional endwise, effectively reciprocating movement to the motion conversion member with consequent bi-directional rotary movement to the drum when the motion conversion member is tensioned.

The motion conversion member may be a number of shapes and materials. By way of example, it could be cable-shaped or ribbon-shaped. What is important is that it comprise an elongate body of sufficiently high-strength, flexible material. Where the motion conversion member is ribbon-shaped, it may be necessary to have such means as a lateral step in its body portion so that it may overly the drum spirally without interfering with its own operation whereby the motion conversion member can overly itself in two or more axially disparate locations on the drum. Still further, the motion conversion member may be somewhat of a hybrid wherein it is a member with a generally flattened-oval cross section. Such a member could comprise a plastic sheath with a flattened-oval cross section possibly with a core of one or more cables. In such an embodiment, the lateral step needed for ribbon-shaped members may not be necessary, and an increased contact area between the motion conversion member and the drum would be likely to require less wrapping than would be required with a cable motion conversion member. In preferred embodiments, an elongated and generally rigid drive arm drivably connected to the force receiver and drivingly coupled to the motion conversion member at at least one connection point may be employed to drivingly connect the force receiver to both ends of the motion conversion member instead of just one end.

It is presently preferred that the manual actuator mechanism be much like a bicycle brake lever arrangement with a flexible inner member slidably contained in an outer sheath and with a hand lever at an actuating end and the inner member projecting beyond a termination point of the outer sheath at an actuated end. The actuated end of the actuator mechanism should be operably connected to the drive arm and to a connection point of the motion conversion member in any way sufficient to produce relative motion therebetween. For example, the termination point of the outer sheath may be fixedly connected to the drive arm while the inner member continues beyond that point to overly the drum and then to drivably and fixedly connect to the drive arm. In such an arrangement, the inner member not only functions as part of the actuator mechanism but also acts as the flexible motion conversion member. The inner member additionally may overly a direction-reversing pulley that is rotatably connected to the drive arm before overlying the drum and drivably and fixedly connecting to the drive arm.

Alternatively, the motion conversion member may have a first end reciprocatably and drivably connected to the drive arm and a second end fixedly connected to the drive arm and the actuated end of the actuator mechanism operably connected to the first end of the motion conversion member and to the drive arm for producing relative motion therebetween. A connection for producing relative motion between the first end of the motion conversion member and the drive arm may be accomplished by fixedly coupling the outer sheath of the actuator mechanism to the drive arm while coupling the inner member to the first end of the motion conversion member.

The inner member may be coupled directly to the motion conversion member or it may be coupled by a motion reversing means such as an actuating lever pivotally connected to the drive arm by a pivot post with the inner member coupled to a first end of the actuating lever and the motion conversion member coupled to the second end of the lever. The connection for producing relative motion between the first end of the motion conversion member and the drive arm alternatively may be accomplished by fixedly coupling the inner member to the drive arm and fixedly connecting the outer sheath to the first end of the motion conversion member.

In manually actuated assemblies, it may be advantageous to include further a means for biasing the actuator mechanism to a non-actuated position wherein the motion conversion member is in a slackened, disengaged state. The biasing means may be the previously-described resiliently compressible clutch collar interposed between the drum and the flexible motion conversion member or it may be a spring such as one operably associated with the actuator mechanism for biasing the actuated end of the inner member away from the actuating end of the actuator mechanism.

Depending on the application and other factors, it may be desirable to alter the Frictional relationship of the clutch collar relative to the drum and, alternatively or additionally, of the clutch collar relative to the motion conversion member by means of a friction contact surface. Again depending on the desired effect, the friction contact surface may be chosen to increase friction, to decrease friction, or merely to absorb the damaging effects friction tends to inflict.

One skilled in the art can conceive of many uses for such a motion conversion assembly. For example, the assembly may be employed as a vehicle propulsion system for an occupant-propelled vehicle with a vehicle body. The propulsion system would include, in addition to the movable force receiver, the motion conversion member, and the actuator mechanism, a drive wheel rotatably coupled to the vehicle body for contact with an environmental surface and a drum rotatably coupled to the vehicle body and drivably engaged with the drive wheel whereby a rotation of the drum yields a resultant rotation of the drive wheel to propel the vehicle and a restriction of rotary movement of the drum restricts rotary motion of the drive wheel to brake the vehicle. In such a vehicle, the drum may be coaxial with the drive wheel or it may be drivingly engaged with the drive wheel by a flexible endless drive means.

The direction of rotation of the drive wheel depends on the direction of rotation of the drum which, in turn, is dictated by the direction of reciprocating movement of the motion conversion member and the side from which the motion conversion member overlies the drum. Stated alternatively, for a given side from which the motion conversion member overlies the drum, a reversal of the direction of reciprocating movement of the motion conversion member will reverse the direction of rotary motion of the drum and the drive wheel. Furthermore, reciprocating movement of the motion conversion member in a first direction will induce rotary motion of the drum in a first rotary direction when the motion conversion member overlies the drum from a first side while reciprocating movement of the motion conversion member in that same first direction will induce rotary motion of the drum in a second rotary direction opposite the first when the motion conversion member overlies the drum from a second side opposite the first side.

The vehicle propulsion system described above may be employed on a number of occupant-propelled vehicles such as, for example, a wheel chair. It is contemplated that a single propulsion system may power such a vehicle. It may power a single drive wheel, or it may power two or more drive wheels. Alternatively, two propulsion systems may be employed. The chair may have a first vehicle propulsion system propelling and braking a first drive wheel and a second vehicle propulsion system independently propelling and braking a second drive wheel. With two independent propulsion and braking systems, an occupant could propel the vehicle by an effectively simultaneous propulsion of both drive wheels, brake the vehicle by an effectively simultaneous braking of both drive wheels, and steer the vehicle by a differential propulsion and/or braking of the drive wheels. Still further, it is certainly true that one could employ a single propulsion system to drive two drive wheels or two propulsion systems to drive a single drive wheel.

In occupant-propelled vehicles such as wheel chairs, the force receiver may be a lever of a given length pivotally connected to the vehicle at a pivot axis whereby an oscillation of the lever imparts an endwise, reciprocating movement to the motion conversion member of a given maximum amplitude. There may be single or twin lever propulsion systems. Single lever propulsion systems may be most useful for persons who have experienced a stroke, persons with cerebral palsy, and persons who have experienced an amputation. Twin lever propulsion systems would be most suitable for those who possess sufficient strength, mobility, and coordination in both arms.

The lever may comprise a first section slidingly or telescopingly engaged with a second section whereby the length of the lever may be adjusted selectively. Since the amplitude of oscillation of a point on a lever is proportional to the distance of that point from the lever's pivot point, a most preferred embodiment of the invention permits the adjustment of a drive point of the drive arm along at least a portion of the lever's length. Increasing the distance between the drive point and the pivot point increases the rotation of the drum per unit oscillation of the lever, and decreasing the distance between the drive point and the pivot point decreases the rotation of the drum per unit oscillation of the lever. By this means, the vehicle may be geared to adapt to speed, terrain, and an occupant's strength.

One will realize that the foregoing discussion broadly outlines the more important features of the invention to enable a better understanding of the detailed description that follows and to instill a better appreciation of the inventor's contribution to the art. Before any embodiment of the invention is explained in detail, it must be made clear that the following details of construction, descriptions of geometry, and illustrations of inventive concepts are mere examples of possible manifestations of the invention.

Figure 8:
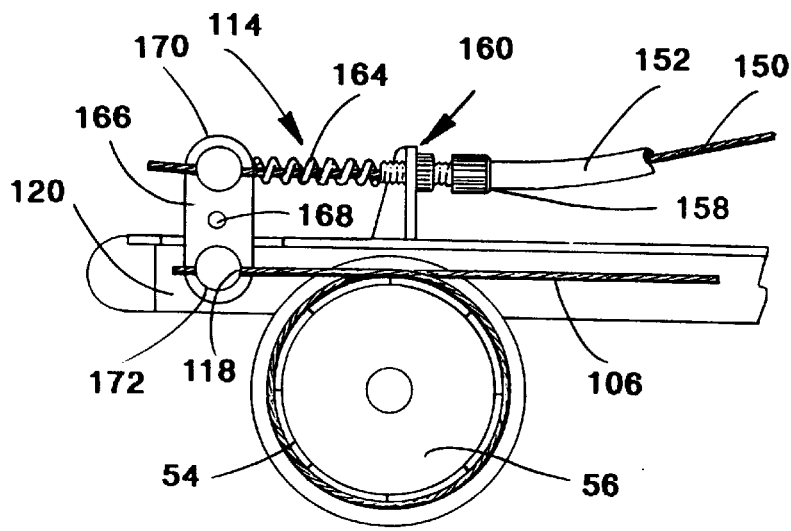
Figure 9:
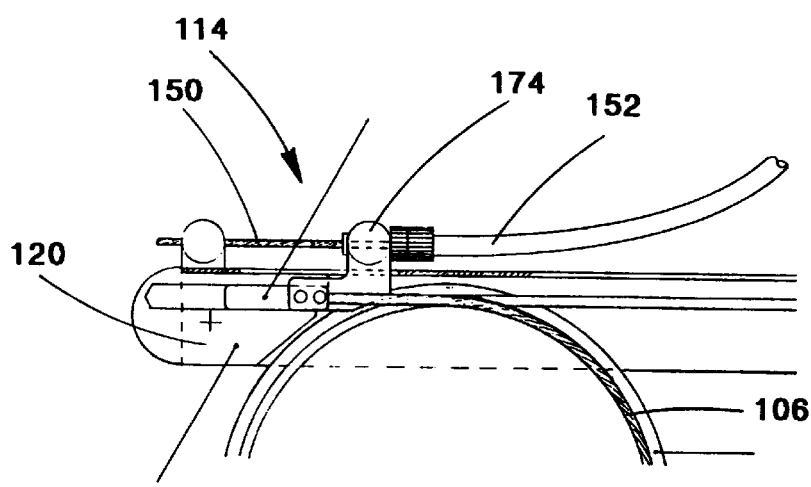
Figure 10:
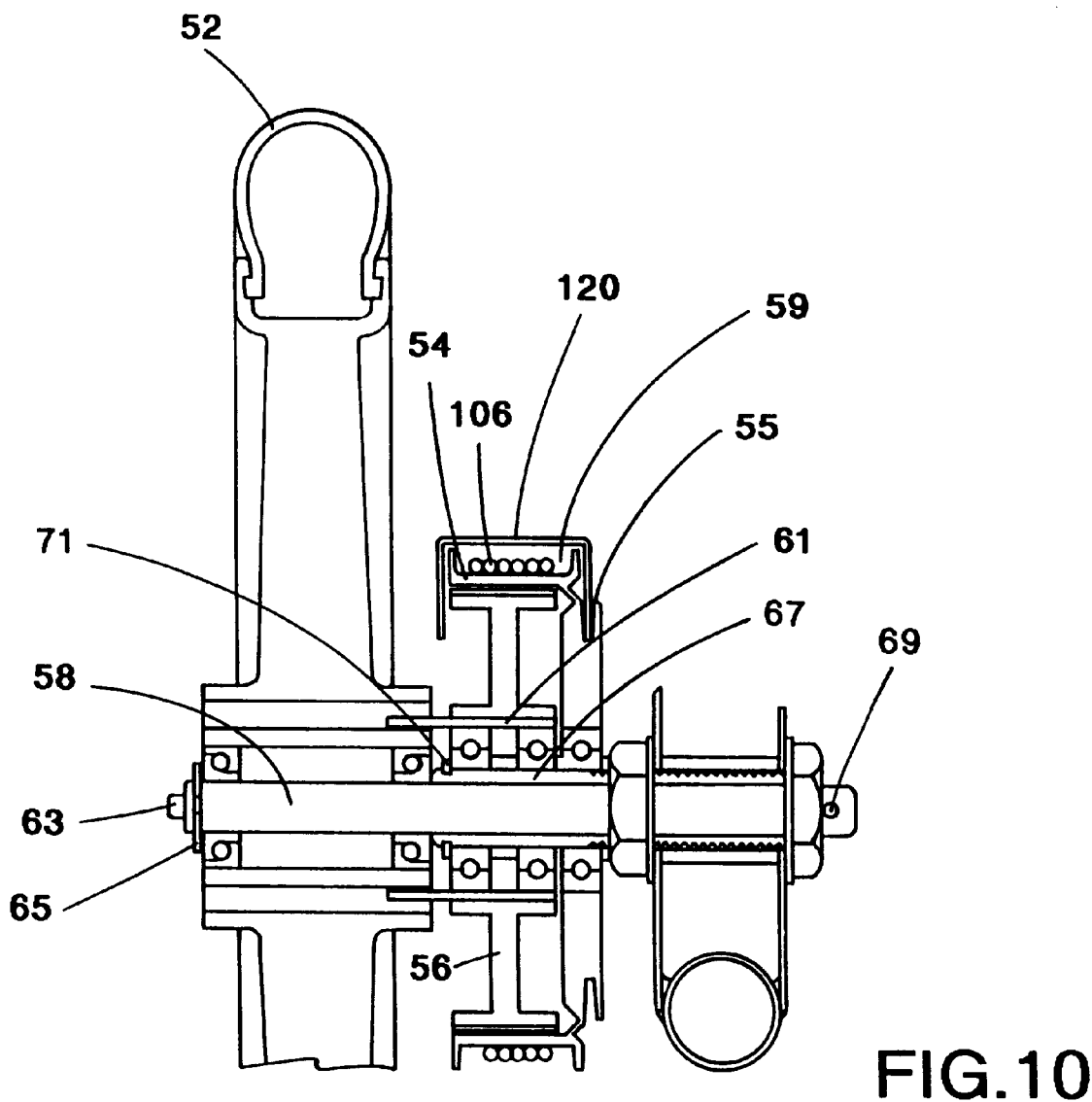
Figure 10A:
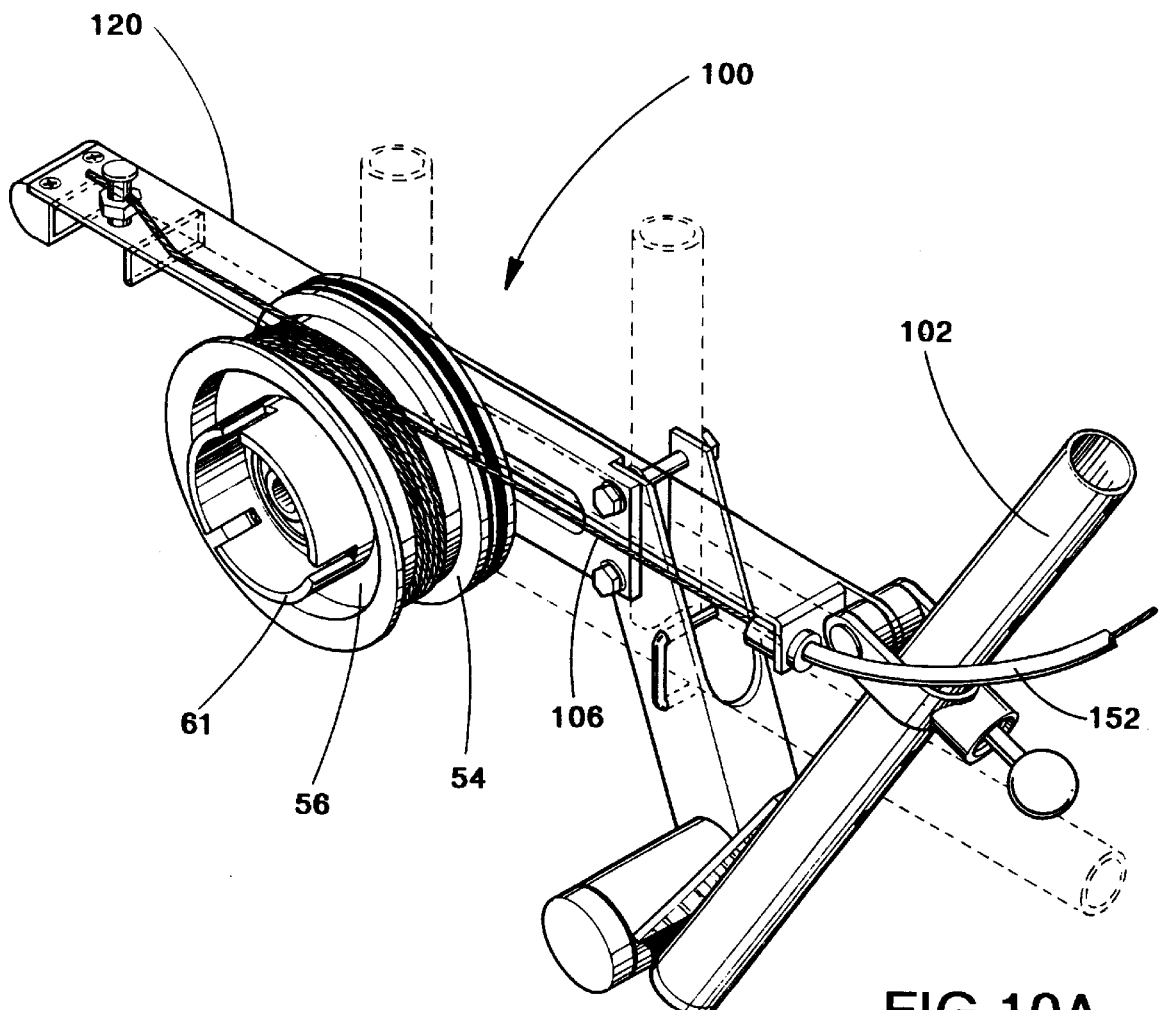
Figure 11:
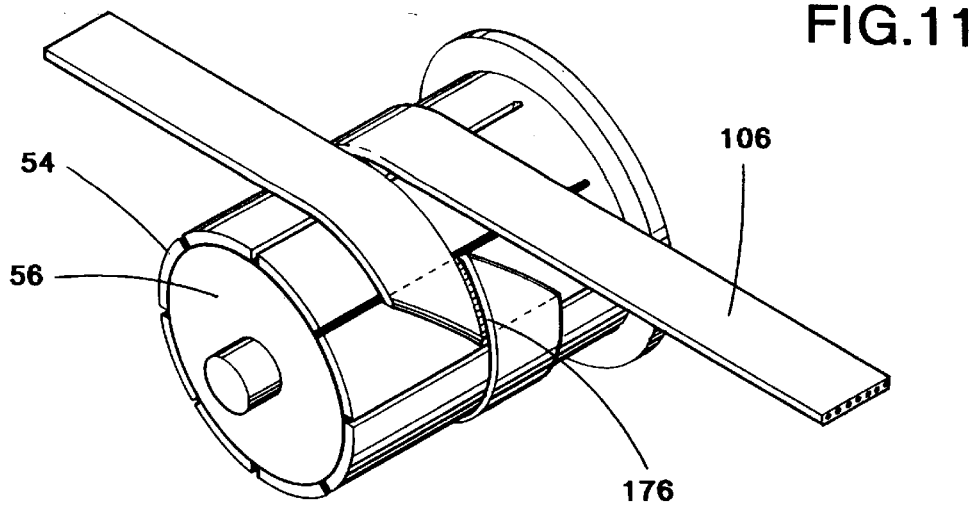
Figure 11A:
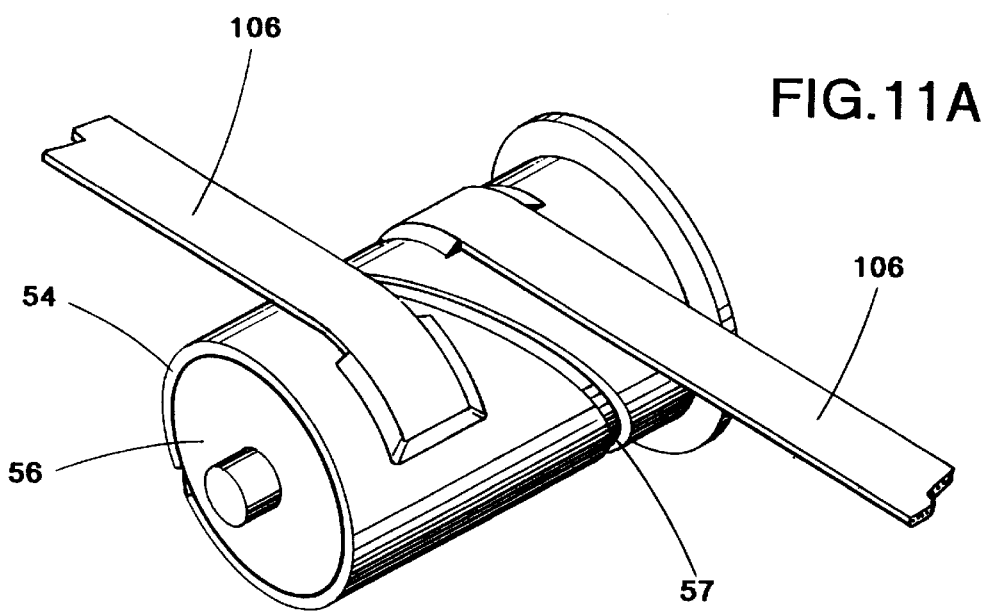
Figure 11B:
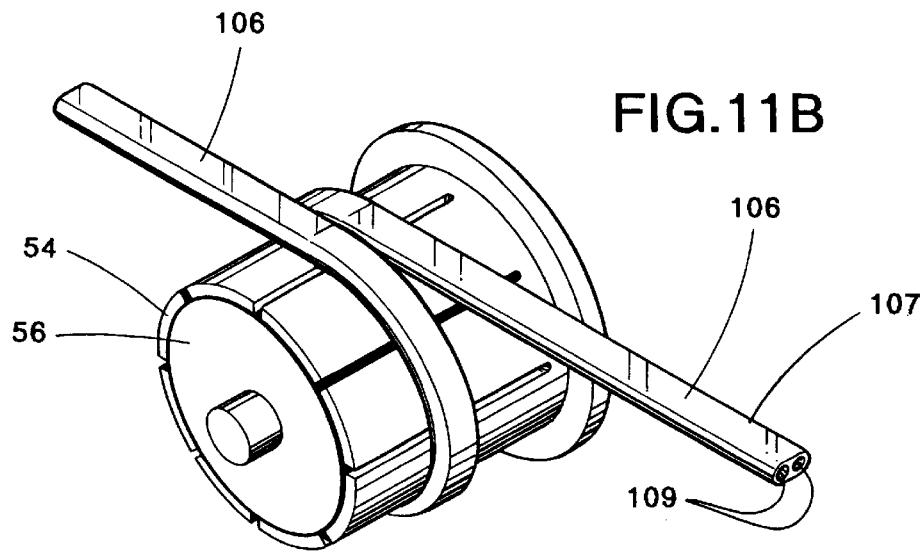
Figure 12:
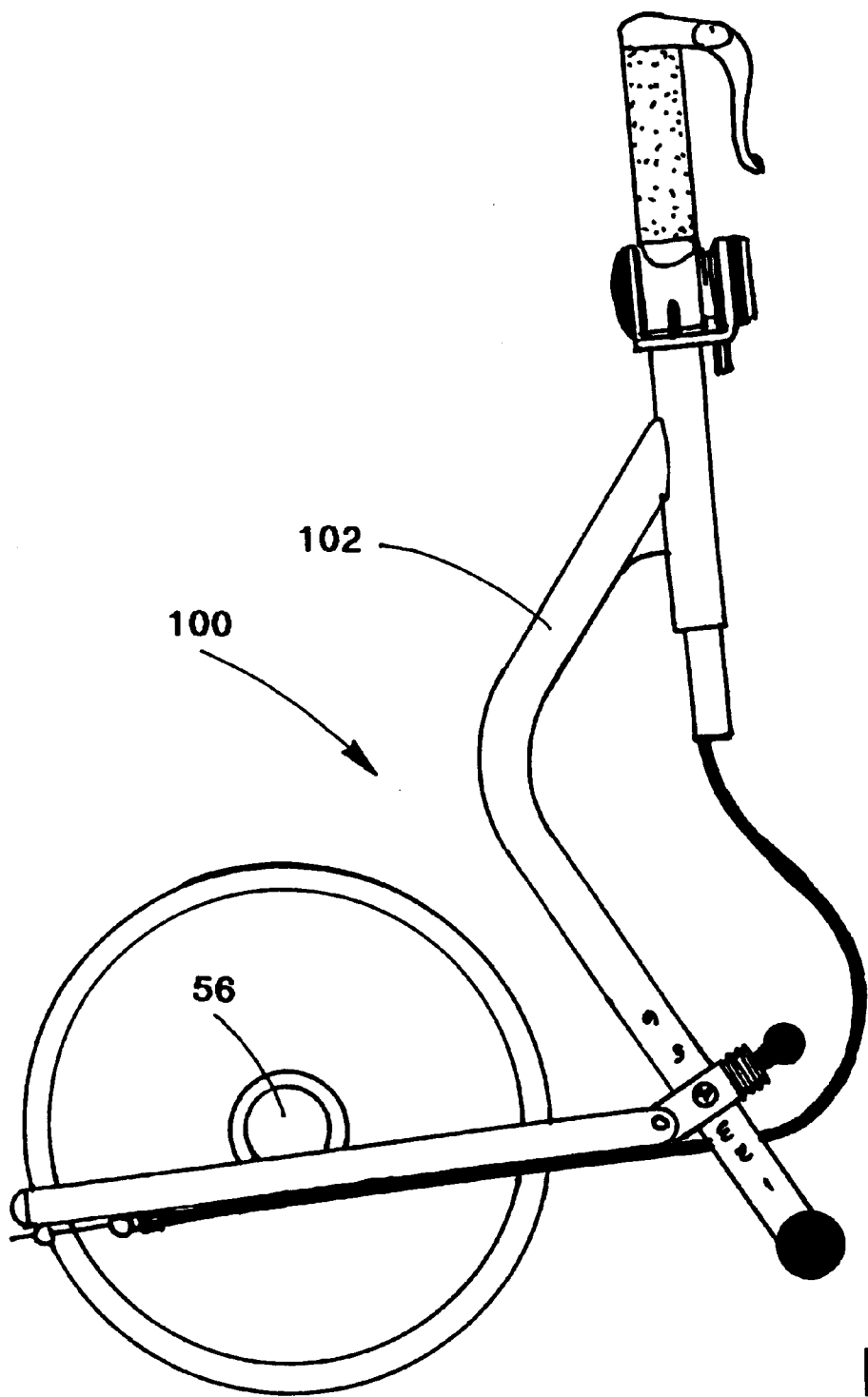
Figure 13:
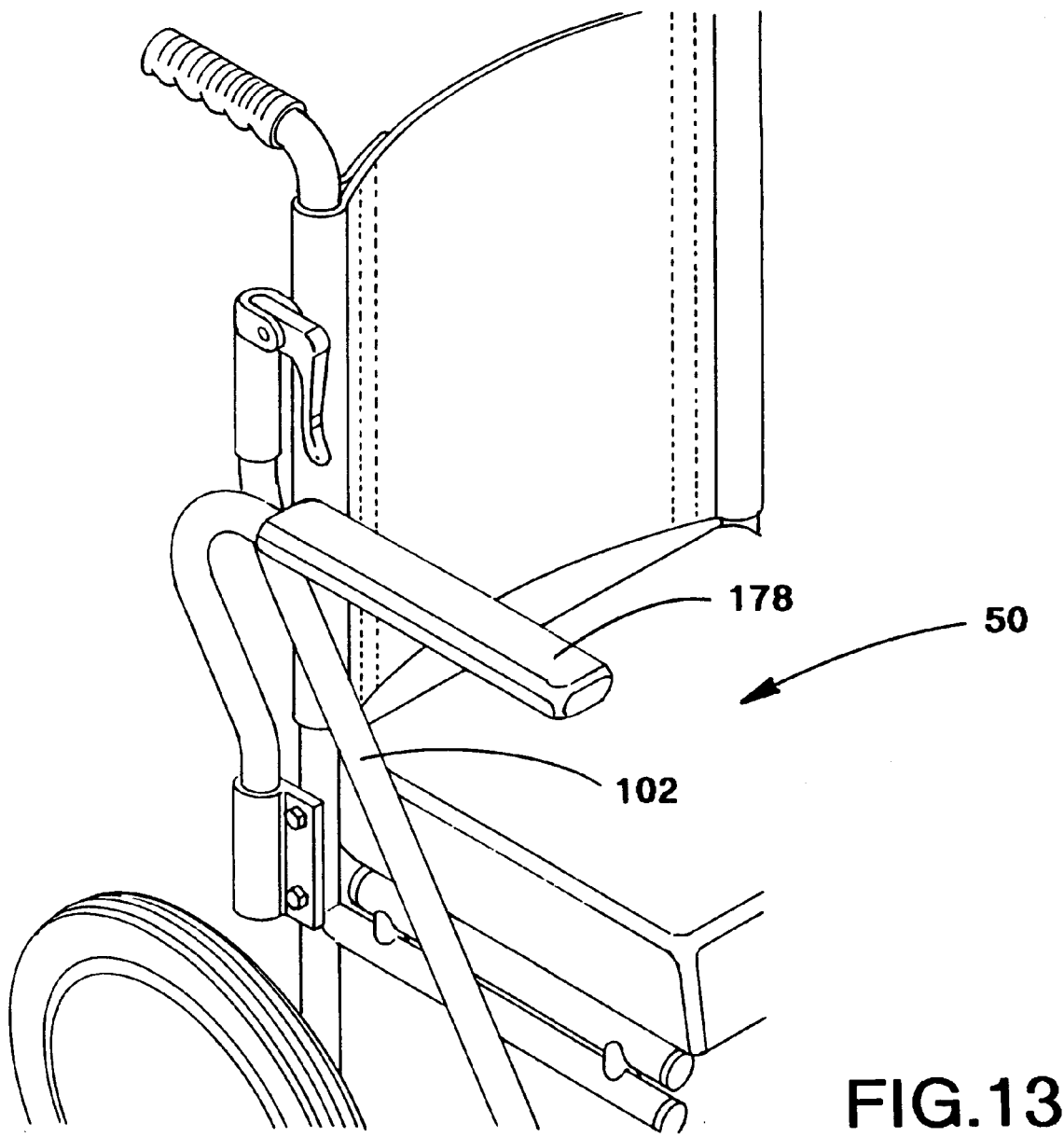
Figure 14:
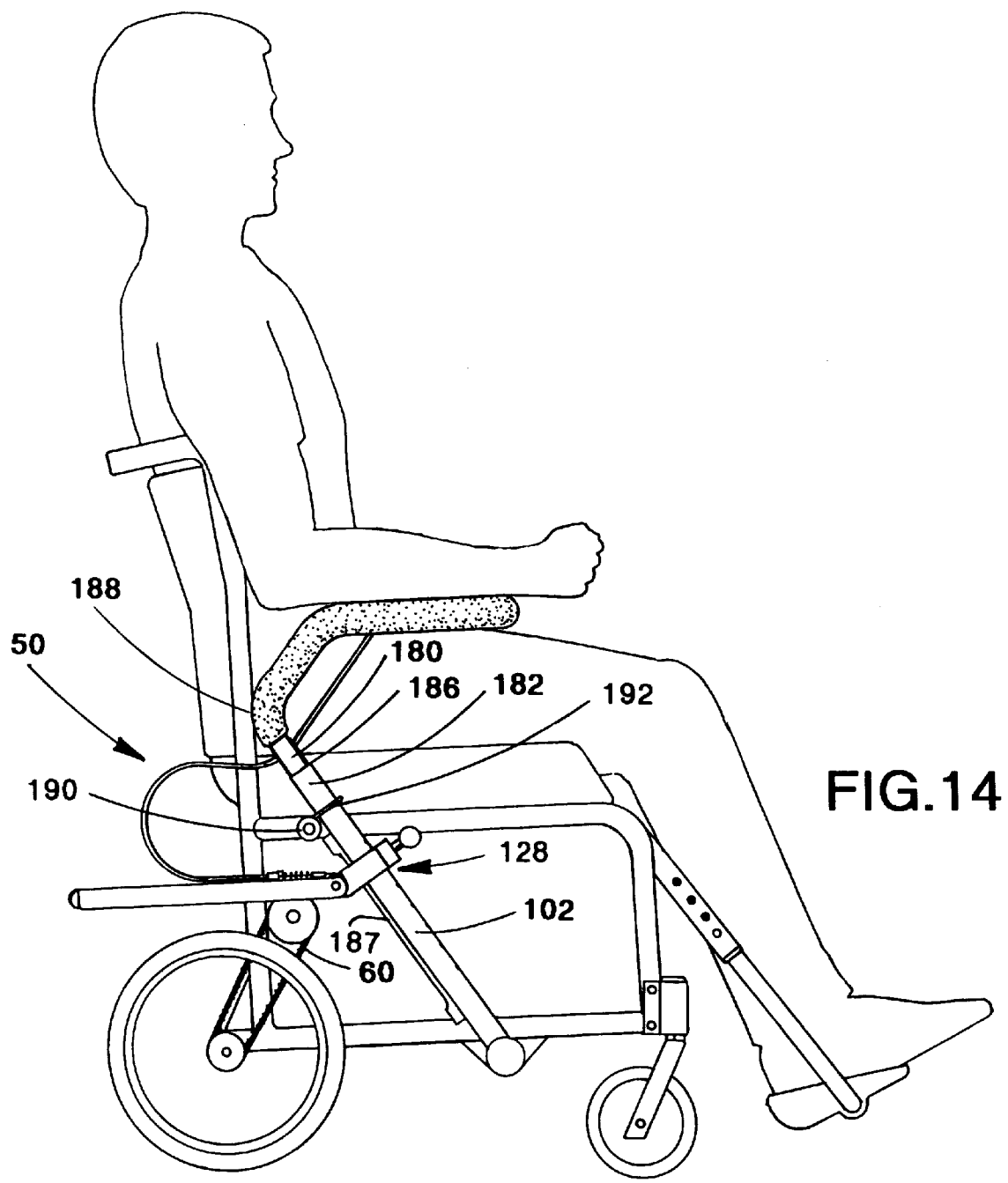
Figure 14A:
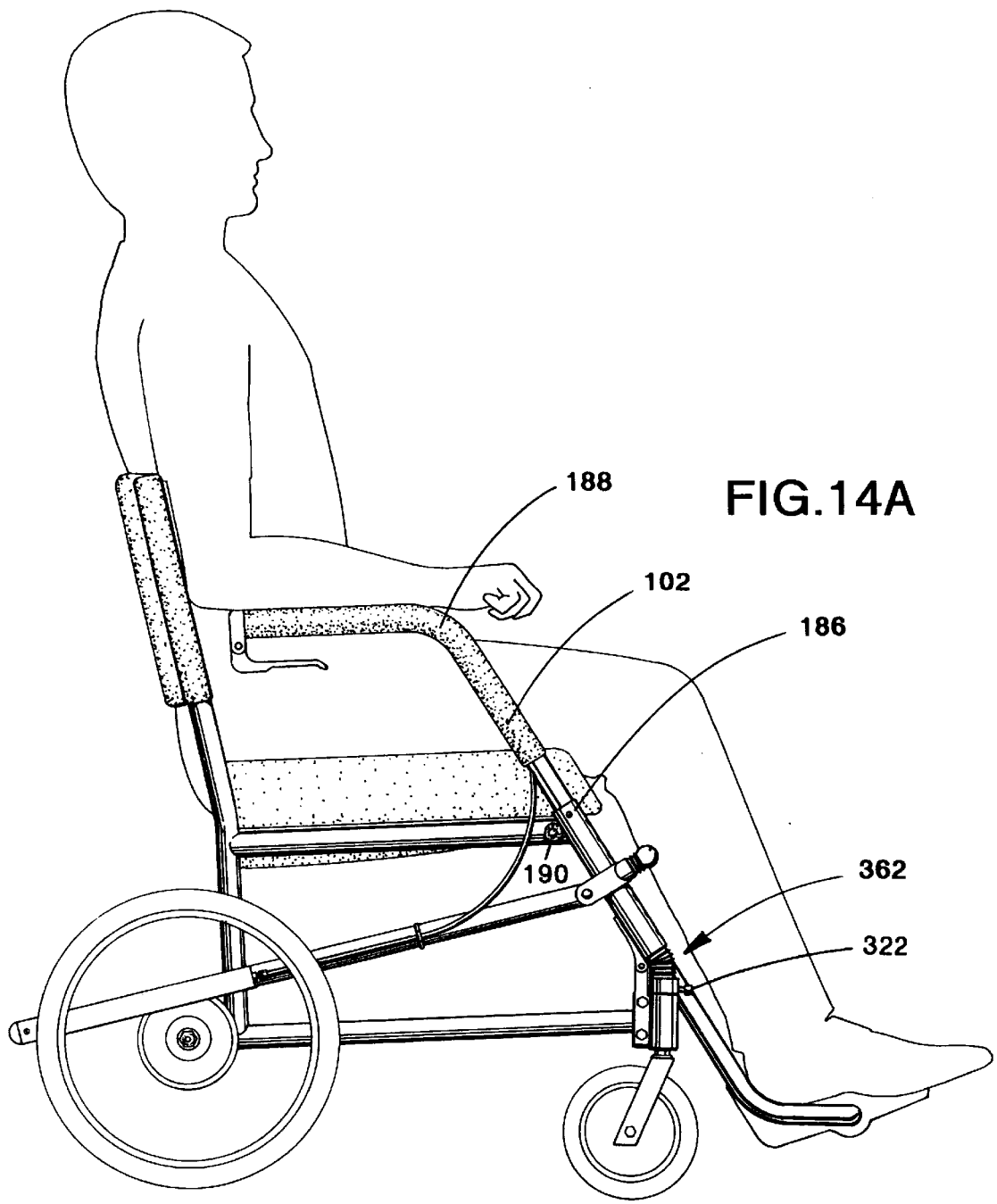
Figure 15:
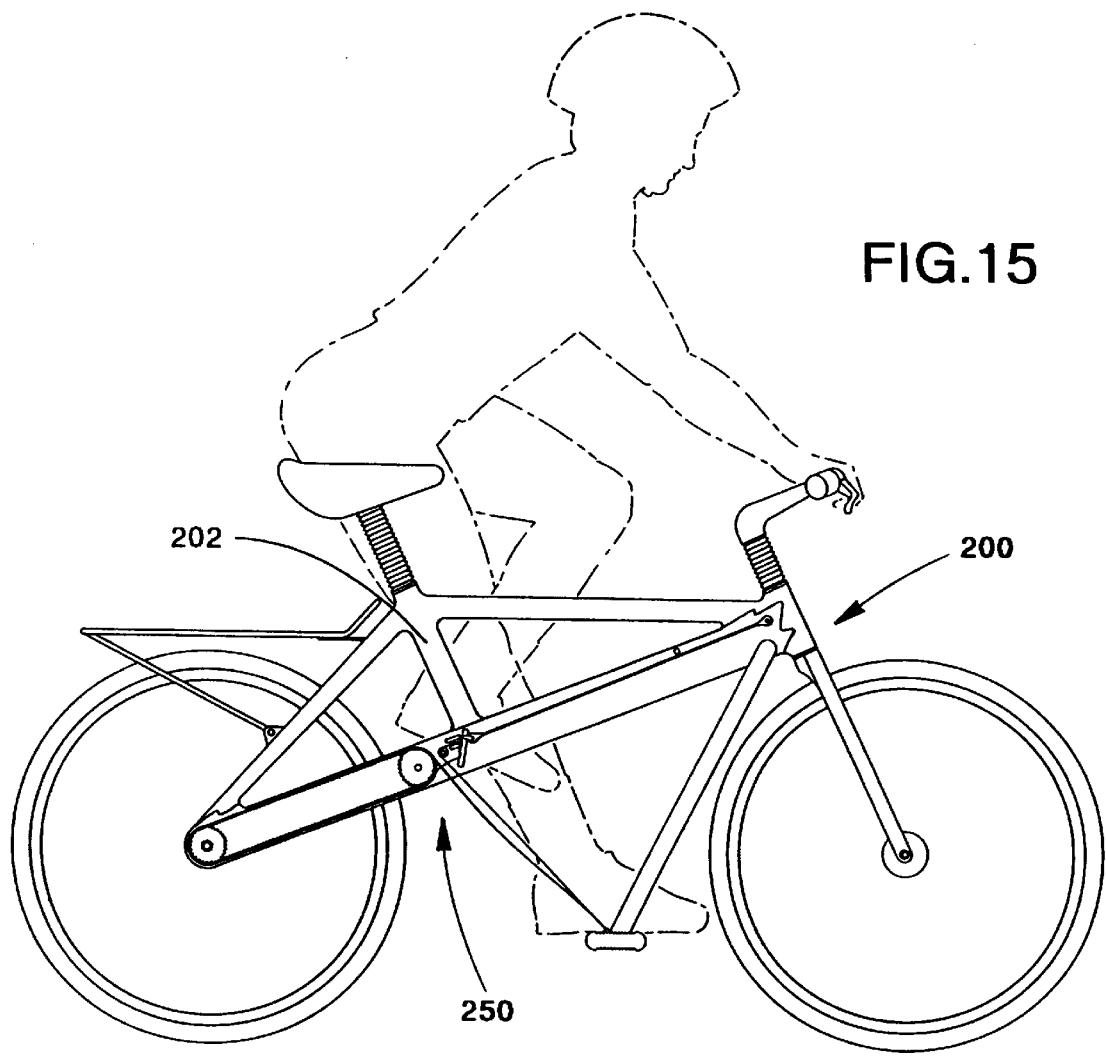
Figure 15A:
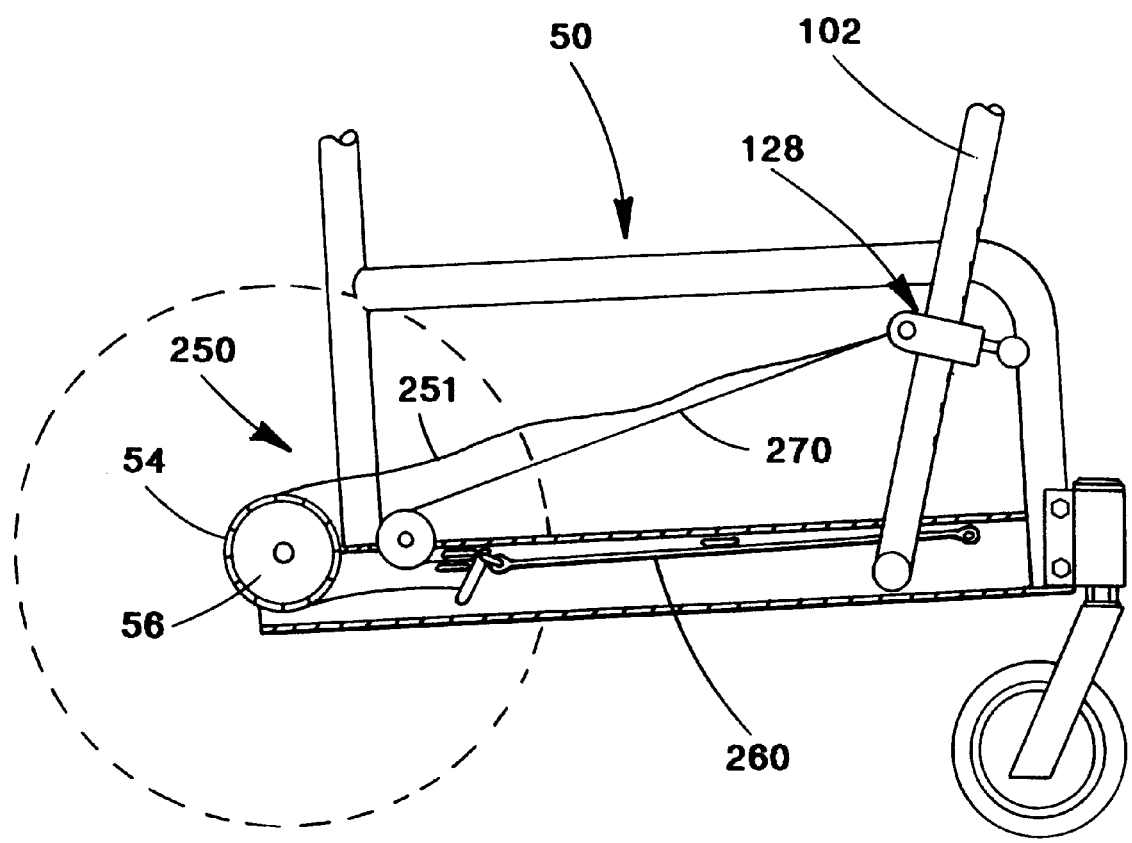
Figure 17:
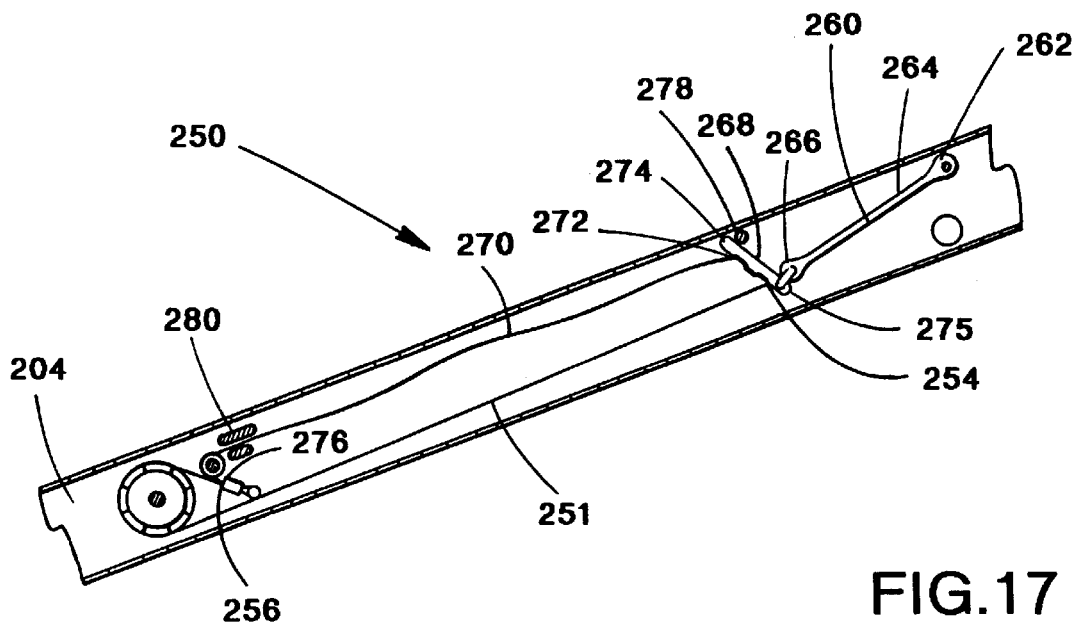
Figure 16:
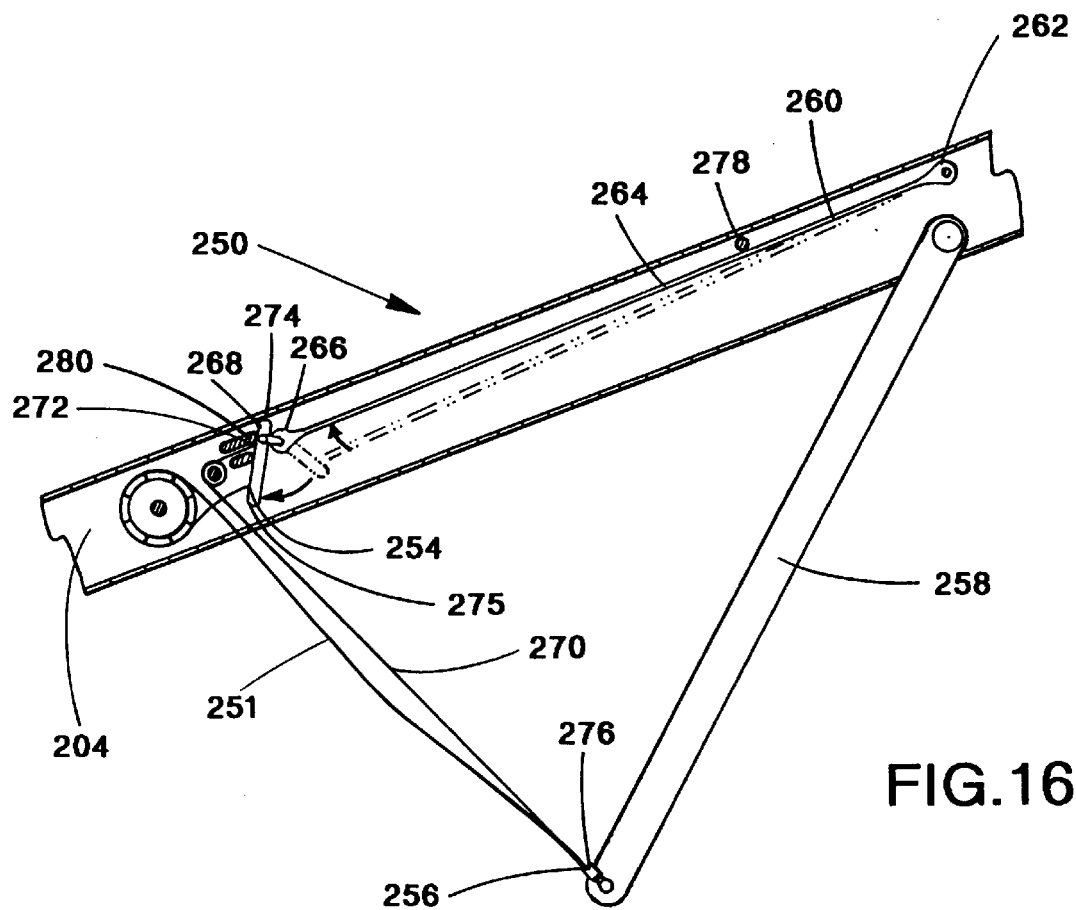

FIG, 7 is a view in side elevation of an alternative manner of connecting the motion conversion member to the drive arm;

FIG. 8 is a view in side elevation of still another manner of connecting the motion conversion member to the drive arm and to the inner member of the actuating mechanism;

FIG. 9 is a view in side elevation of another connection of the motion conversion member to the drive arm and to the inner member of the actuating mechanism;

FIG. 10 is a view in cross section of the axle-related portion of a quick-release motion conversion assembly according to the present invention;

FIG. 10A is a perspective view of a variation of the quick-release motion conversion assembly of FIG. 10 shown with substantially an entire motion conversion assembly;

FIG. 11 is a perspective view of a ribbon-shaped motion conversion member shown with a clutch collar and drum;

FIG. 11A is a perspective view of an alternative ribbon motion conversion member shown with a clutch collar and drum;

FIG. 11B is a perspective view of still another motion conversion member shown with a clutch collar and drum;

FIG. 12 is a view in side elevation of an alternative motion conversion assembly;

FIG. 13 is a perspective view of an alternative embodiment of the occupant-propelled vehicle of the present invention;

FIG. 14 is a view in side elevation of another alternative embodiment of the occupant-propelled vehicle;

FIG. 14A is a view in side elevation of still another alternative embodiment of the occupant-propelled vehicle;

FIG. 15 is a view in side elevation of an occupant-propelled bicycle with an automatic actuator mechanism;

FIG. 15A is a partial view in side elevation of an occupant-propelled wheel chair with an automatic actuator mechanism:

FIG. 16 is a view in side elevation of the automatically-actuated motion conversion assembly of FIG. 15 at the end of a power stroke; and FIG. 17 is a view in side elevation of the automatically actuated motion conversion assembly of FIG. 15 at the beginning of a power stroke.

REFERENCE CHARACTERS

In the following description and in the accompanying drawings, reference characters are employed as follows:

50 occupant-propelled wheel chair
51 frame
52 wheel
54 resiliently compressible clutch collar
55 annular groove
56 drum
57 helical channel
58 axle
59 furrow
60 flexible endless drive means
61 drum sleeve
62 axle hole
63 quick-release button
64 first frame section
65 axle snap ring
66 second frame section
67 axle cylinder
68 side frame tube section
69 ball snap
70 axle plate adjustment holes
71 axle cylinder snap ring
72 standard wheel
74 axle plate
76 upper frame section
78 lower frame section
100 manually-actuated motion conversion assembly
102 movable force receiver, lever, or force receiving lever
104 axis
106 motion conversion member
107 plastic sheath
108 first reference point
109 cable
110 second reference point
112 body portion
114 actuator mechanism
116 first end of motion conversion member
118 second end of motion conversion member
120 drive arm
122 frictional surface
124 frictional surface
126 drive point
128 shifter mechanism
130 lever
132 sleeve
134 tip receivers
136 coupler
138 lever engaging tip
140 spring
142 fulcrum point
144 hilt
146 ball knob
147 helical spring clamp
148 thumb pad
150 inner member
152 outer sheath
154 hand lever
156 actuating end
158 termination point of sheath
160 actuated end
162 pulley
164 spring
166 actuating lever
168 pivot post
170 first end of actuating lever
172 second end of actuating lever
174 slider
176 lateral step
178 armrest
180 first section of force receiver
182 second section of force receiver
186 pivot axis
187 spine
188 bend
190 support bumper
192 retaining clip
200 occupant-propelled bicycle
202 vehicle frame
204 frame section
250 automatically-actuated motion conversion assembly
251 motion conversion member
254 first end of motion conversion member
256 second end of motion conversion member
258 force receiving lever
260 trip elastic
262 first end of trip elastic
264 body portion
266 second end of trip elastic
268 flip member
270 stop member
272 first end of stop member
274 first end of flip member
275 second end of flip member
276 second end of stop member
278 engaging trip switch
280 disengaging trip switch

DETAILED DESCRIPTION

Figure 1:
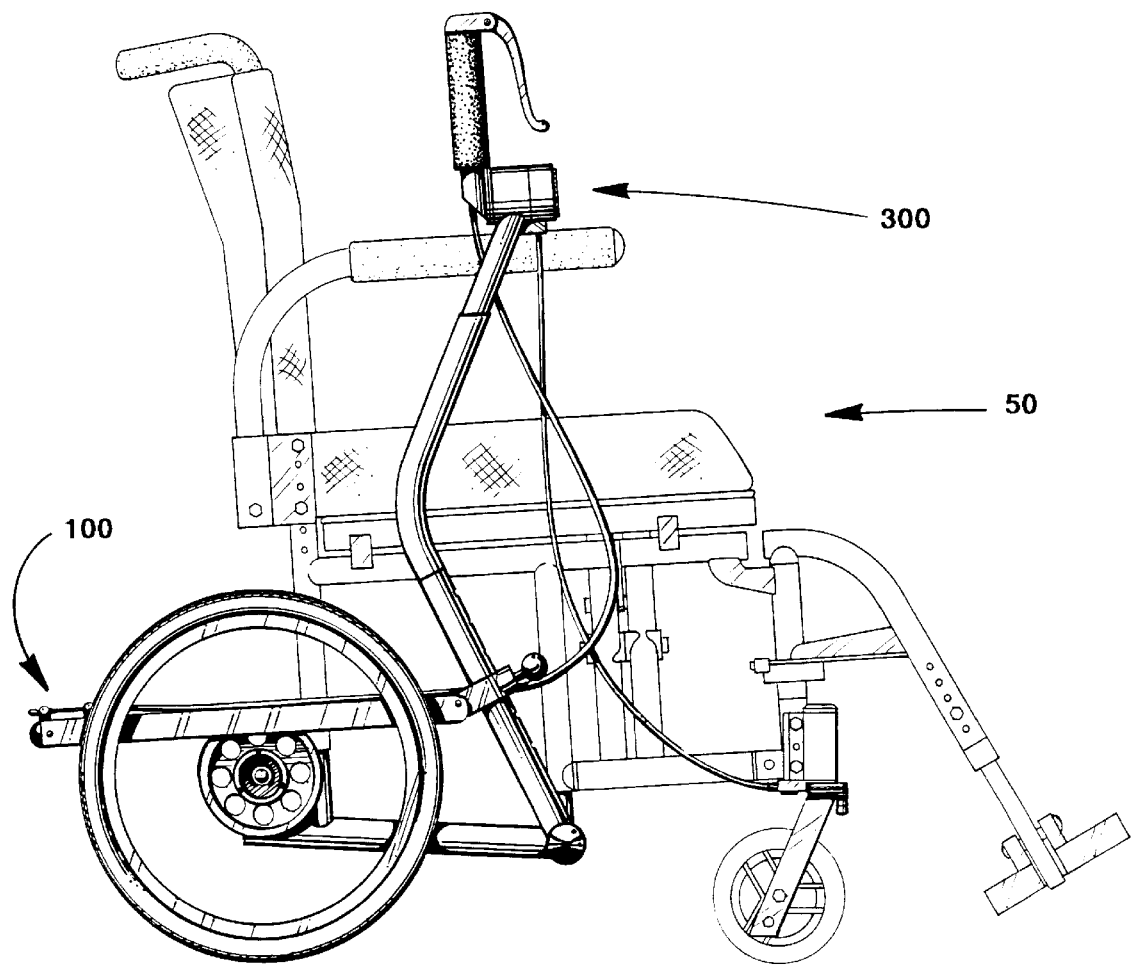
FIG. 1 is a view in side elevation of a wheel chair embodying aspects of the present invention.

Looking first to FIG. 1, a wheel chair employing a multiplicity of the aspects of the present invention is indicated generally at 50. The wheel chair 50 incorporates an embodiment of the manually-actuated motion conversion assembly of the present invention that is indicated generally at 100 to propel, to brake, and, possibly, to steer the wheel chair 50. The wheel chair 50 further employs a vehicle steering arrangement that is indicated generally at 300 but which is not the subject of the present patent.

Figure 2:
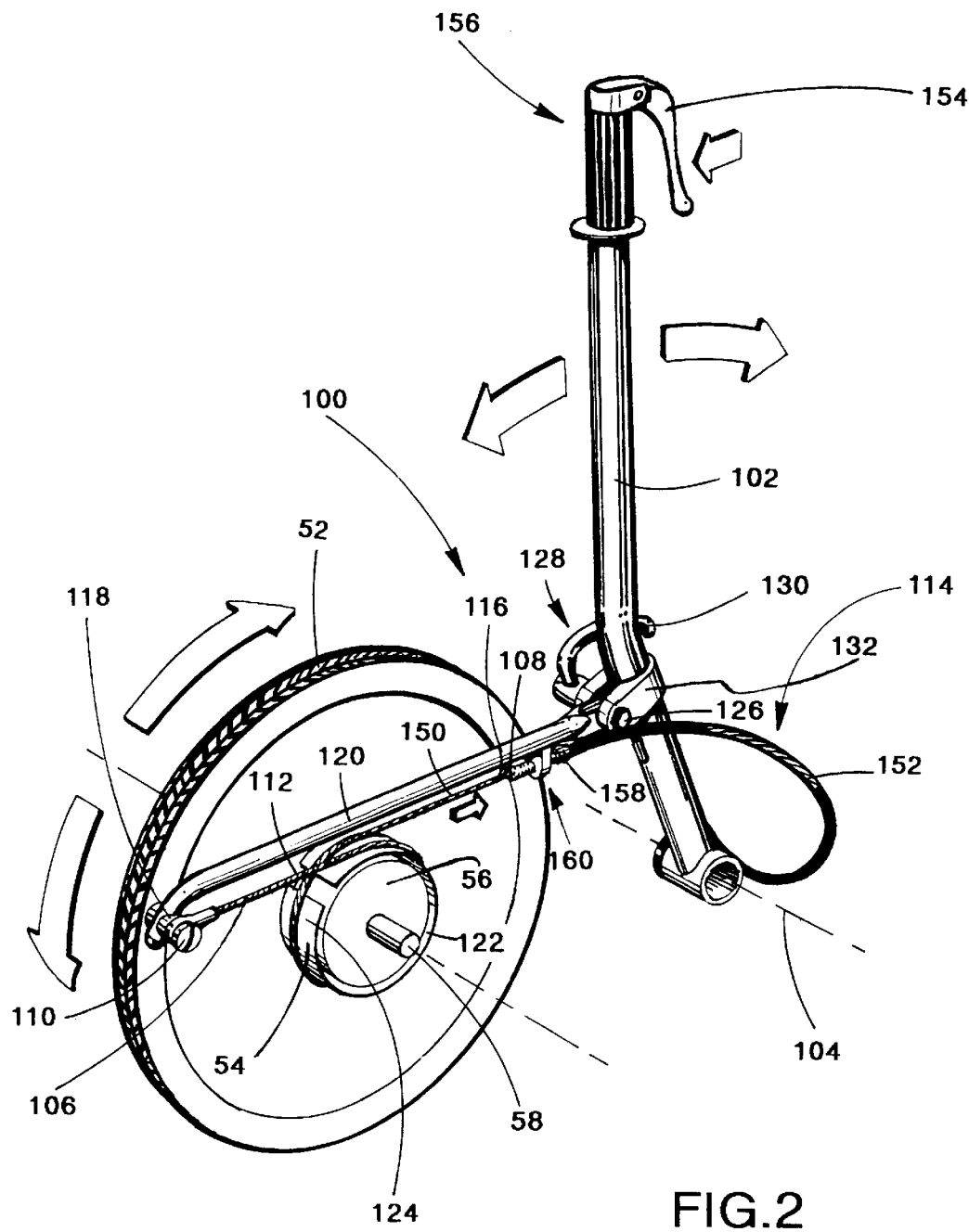
FIG. 2 is a perspective view of a motion conversion assembly according to the present invention as might be used for propulsion of a vehicle by an occupant.

Turning to FIG. 2, there is shown a motion conversion assembly 100 according to the present invention as could be used by an occupant to propel the wheel chair 50 of FIG. 1. For clarity and ease of understanding, the motion conversion assembly 100 is shown generally separate from the wheel chair 50 of FIG. 1. However, certain elements of the wheel chair 50 are included in FIG. 2 as are necessary to make the operation of the motion conversion assembly 100 most clear. Essentially, the motion conversion assembly 100 includes a movable force receiver 102 for receiving an input force from an occupant and oscillating about an axis 104 during a power stroke. Although in the instant the movable force receiver 102 is shown as an oscillating lever, numerous alternative receivers 102 are obvious.

An elongate and flexible motion conversion member 106 is drivably coupled to the force receiver 102 whereby an input force imparting movement to the force receiver 102 imparts endwise, driven movement to the motion conversion member 106. The motion conversion member 106 has a body portion 112 between a first reference point 108 that is spaced an effective-travel distance from a second reference point 110.

With regard to the present specification, Effective-Travel Distance between reference points of the motion conversion member means the cumulative effective distance over which the motion conversion member travels between the reference points without regard to the actual path of travel of the body portion of the motion conversion member (i.e., a loose, sagging motion conversion member traveling a distance X from reference point A to and overlying a drum for exactly one revolution and proceeding a distance Y to reference point B would have an effective-travel distance of X plus Y plus the circumference of the drum although its actual path of travel would be somewhat greater due to the sagging).

The essential components of the motion conversion assembly 100 further include an actuator mechanism shown generally at 114. The actuator mechanism 114 can assume numerous embodiments so long as it is operably associated with the motion conversion member 106 for selectively increasing the effective-travel distance between the first reference point 108 and the second reference point 110 thereby actuating the motion conversion member 106 from a slackened, disengaged state to a tensioned, frictionally engaged state. Although in FIG. 2 a drum 56 is shown to be coaxial with a drive wheel 52, alternatively, the drum 56 may be drivably engaged with the drive wheel 52 by a flexible endless drive means 60 as is shown in the alternative motion conversion assembly 100 of FIG. 14.

In any event, when the motion conversion member 106 is actuated, as the effective-travel distance between first and second reference points 108 and 110 is increased, the body portion 112 of the motion conversion member 106 constricts about a resiliently-compressible clutch collar 54 to compress the collar 54 into frictional contact with the drum 56. As a result, a reciprocating, endwise movement of the motion conversion member 106 will tend to rotate the drum 56. The drum 56 rotates about an axle 58 as does the wheel 52 of the wheel chair 50. The drum 56 is drivably coupled with the wheel 52 whereby a rotation of the drum 56 will tend to rotate the wheel 52 which, in turn, would tend to drive the chair 50 of FIG. 1.

One may observe that such an established dependent mechanical relationship between an occupant, the force receiver 102, the motion conversion member 106, the drum 56, and the wheel 52 would not only permit the occupant to propel a chair 50 forward or backward by a selective movement of the force receiver 102 while the motion conversion member 106 is actuated, but it would also permit an occupant to brake a chair 50 by exploiting the lack of free movement between the motion conversion member 106 and the drum 56 when the occupant restricts the force receiver 102 from moving.

Regarding the resiliently-compressible clutch collar 54, one may note that its resiliency would cause it to tend to expand thereby increasing the effective-travel distance between the first reference point 108 and the second reference point 110 of the motion conversion member 106. As such, the clutch collar 54 may be considered to be a means for biasing the motion conversion member 106 to a disengaged state. In the present embodiment, the frictional relationship of the clutch collar 54 relative to the drum 56 and the frictional relationship of the clutch collar 54 relative to the motion conversion member 106 has been altered by means of a friction contact surface 122 disposed on an inner surface of the clutch collar 54 and a friction contact surface 124 disposed on an outer surface of the clutch collar 54. Depending on the desired effect, the friction contact surfaces 122 and 124 may be chosen to increase friction, to decrease friction, or merely to absorb the damaging effects that friction tends to inflict.

In the preferred embodiment shown in FIG. 2, one sees that the force receiver 102 may be drivingly coupled to a first end 116 and to a second end 118 of the motion conversion member 106 by means of an elongate and generally rigid drive arm 120 whereby the force receiver 102 may impart bi-directional endwise, generally reciprocating movement to the motion conversion member 106 with consequent bi-directional rotary movement of the drum 56 when the motion conversion member 106 is tensioned. The drive arm 120 is drivably connected to the force receiver 102 at a drive point 126. For a given drive point 126, an oscillation of the force receiver 102 imparts an endwise, reciprocating movement to the motion conversion member 106 of a given maximum amplitude.

Since the amplitude of oscillation of a point on a lever is proportional to the point's distance from the lever's axis of rotation, this preferred embodiment of the invention permits an adjustment of the drive point 126 of the drive arm 120 along at least a portion of the lever force receiver's 102 length by a mechanism indicated generally at 128 for shifting the drive point 126. Increasing the distance between the drive point 126 and the pivot axis 104 increases the rotation of the drum 56 per unit oscillation of the lever force receiver 102, and decreasing the distance between the drive point 126 and the pivot axis 104 decreases the rotation of the drum 56 per unit oscillation of the lever force receiver 102. By this means, the wheel chair 50 may be geared to adapt to speed, terrain, and an occupant's strength.

Figure 3:
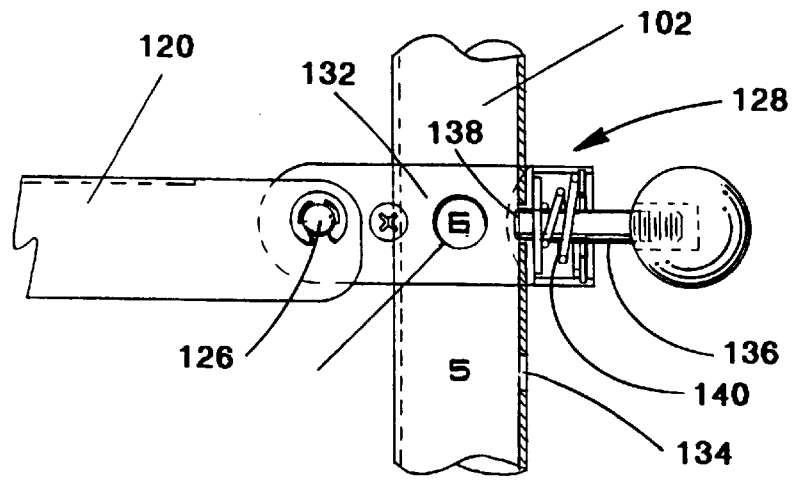
FIG. 3 is a partially sectioned view in side elevation of a shifter mechanism according to the present invention.
Figure 4:
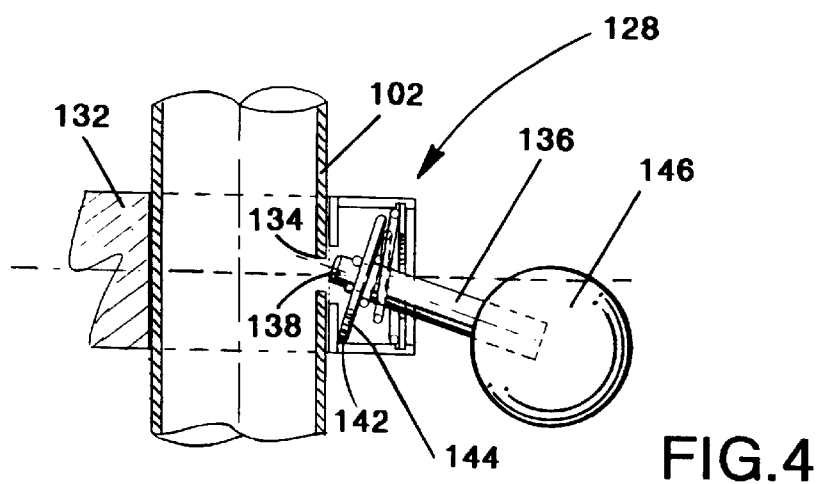
FIG. 4 is a partially sectioned view in side elevation of the shifter mechanism of FIG. 3.

In FIG. 2, the shifter mechanism 128 is of a quick-release type that is commonly known wherein a rotation of a lever 130 clamps and unclamps a sleeve 132 about the lever force receiver 102. An alternative shifter mechanism 128 is shown in FIGS. 3 and 4. The shifter mechanism 128 again has sleeve 132 slidably engaged with the lever force receiver 102. A multiplicity of tip receivers 134 are generally aligned along at least a portion of the length of the lever force receiver 102, and a coupler 136 passes through the sleeve 132 and has a lever engaging tip 138 retractably biased by a spring 140 to engage a tip receiver 134 whereby the lever engaging tip 138 may be retracted from a given tip receiver 134 to permit a sliding of the sleeve 132 along the force receiver 102 with a consequent adjustment of the drive point 126 of the drive arm 120.

Figure 5:
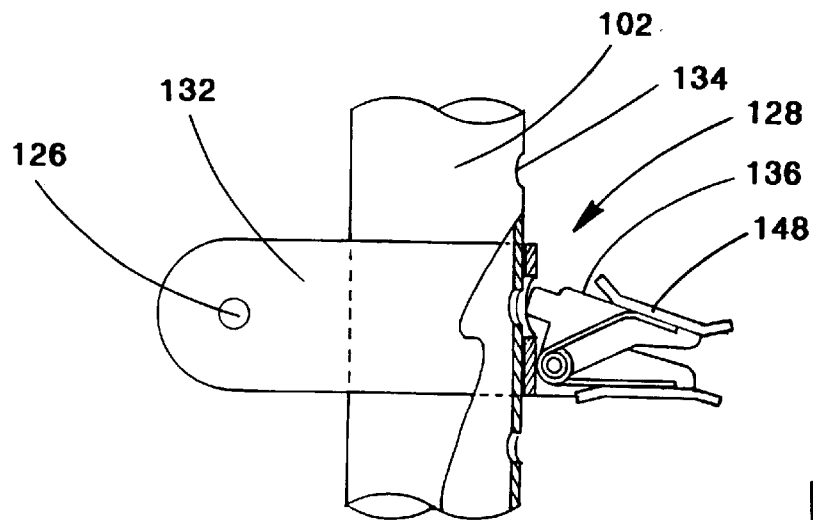
FIG. 5 is a partially sectioned view in side elevation of an alternative shifter mechanism.
Figure 6:
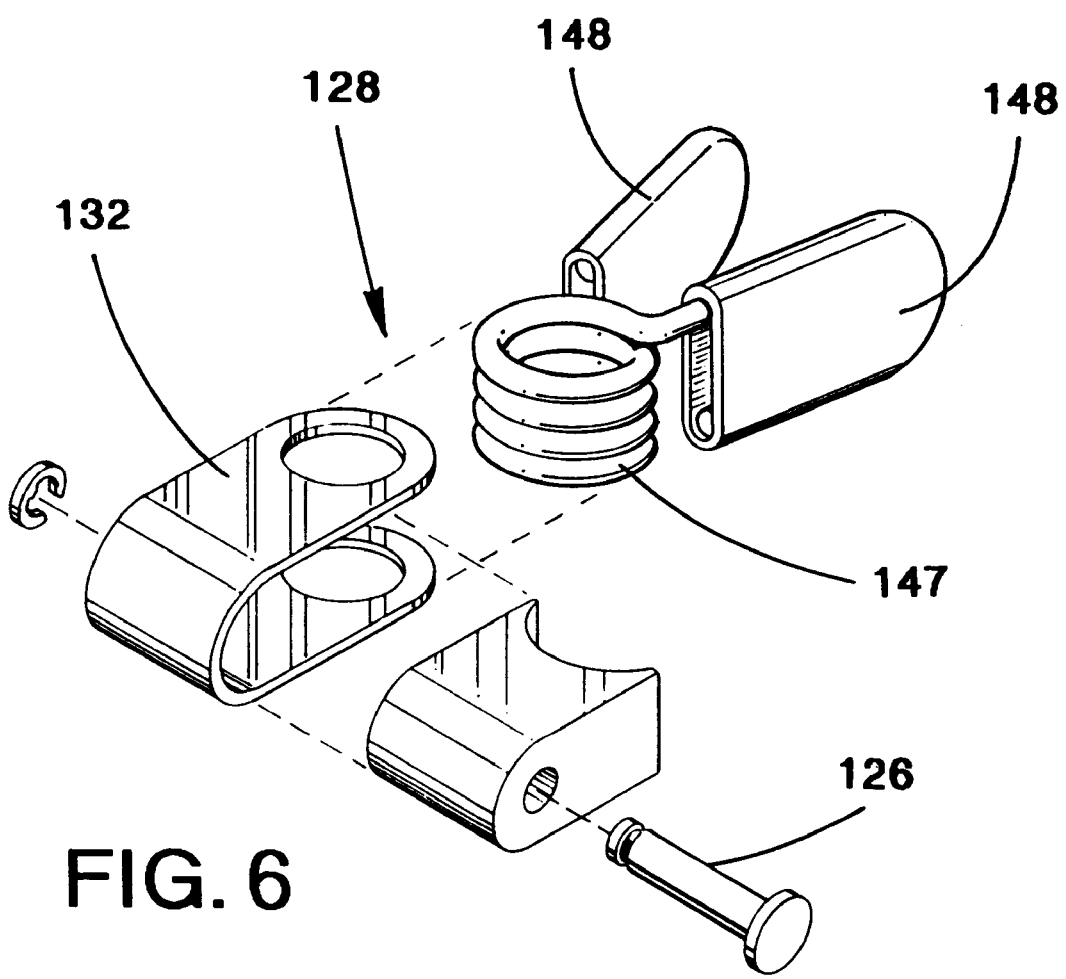
FIG. 6 is a perspective view of yet another shifter mechanism.

Since ease of shifting may be considered a primary concern, the coupler 136 is shown to be rod-shaped with a ball knob 146 distal to the sleeve 132. The coupler 136 is tiltable about a fulcrum point 142 on a hilt 144 whereby a tilting of the coupler 136 pivots the coupler 136 about the fulcrum point 142 to retract the lever engaging tip 138 from the tip receiver 134 thereby permitting a sliding of the sleeve 132. The alternative shifter mechanism 128 shown in FIG. 5 is numbered similarly to FIG. 4 and shows an alternative shifter mechanism 128 with a coupler 136 with a depressible thumb pad 148. A still further shifter mechanism 128, shown in FIG. 6, is comprised of a helical spring clamp 147. The resilient spring clamp 147 has opposed thumb pads 148 that, when squeezed, permit a sliding adjustment of the drive point 126 of the drive arm 120.

Figure 7:
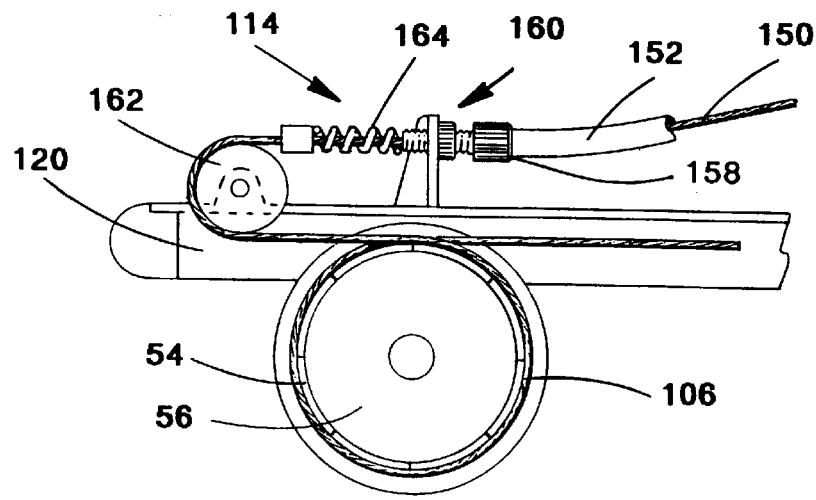

Looking back to FIG. 2 and at FIG. 7, the actuator mechanism 114 is seen to be much like a bicycle brake lever arrangement with a flexible inner member 150 slidably contained in an outer sheath 152 and with a hand lever 154 at an actuating end 156 and the inner member 150 projecting beyond the termination point 158 of the outer sheath 152 at an actuated end 160. Relative motion between the drive arm 120 and the first reference point 108 of the motion conversion member 106 is effected in the embodiment of FIG. 2 by having the termination point 158 of the outer sheath 152 fixedly connected to the drive arm 120 while the inner member 150 continues beyond that termination point 158 to overly the drum 56 and then to drivably and fixedly connect to the drive arm 120 at the second end 118 of the motion conversion member 106.

As such, the inner member 150 not only functions as part of the actuator mechanism 114 but it also acts as the flexible motion conversion member 106. As FIG. 7 shows, the inner member 150 may overly a direction-reversing pulley 162 that is rotatably connected to the drive arm 120 before overlying the drum 56 and drivably and fixedly connecting to the drive arm 120 (fixed connection not shown in FIG. 7). Such an embodiment may include further a spring 164 acting as the means for deactuating the motion conversion member 106 toward a disengaged state.

Alternatively, the motion conversion member 106 and the inner member 150 may be separate members as is shown in FIGS. 8 and 9. FIG. 8 shows that, instead of being coupled directly to the inner member 150, the motion conversion member 106 may be coupled to the inner member 150 by a motion reversing means such as an actuating lever 166 pivotally connected to the drive arm 120 by a pivot post 168 with the inner member 150 coupled to a first end 170 of the actuating lever 166 and the motion conversion member 106 coupled to a second end 172 of the actuating lever 166. Naturally, the length of the lever 166 may be adjusted to alter the leverage and relative motion of the inner member 150 relative to the motion conversion member 106. As is shown in FIG. 9, a simple means of associating the actuator mechanism 114 with the motion conversion member 106 for producing relative motion therebetween may be to connect the inner member 150 fixedly to the drive arm 120 while connecting the outer sheath 152 and the first end 116 of the motion conversion member 106 to a slider 174 which is slidably connected to the drive arm 120.

FIG. 10 shows certain elements of a preferred motion conversion assembly 100 in cross section. The axle 58 passes through an axle cylinder 67, which rotatably supports the wheel 52 and the drum 56. Interdependent movement between the wheel 52 and the drum 56 is ensured by a male/female connection of slotted drum sleeve 61 with wheel 52. The axle cylinder 67 also rotatably supports resiliently compressible clutch collar 54. Both the drum 56 and the clutch collar 54 are prevented from sliding off of the axle cylinder 67 by an axle cylinder snap ring 71. The clutch collar 54 has an annular groove 55 that provides a rolling support to the C-shaped-cross-section drive arm 120. The motion conversion member 106 is wrapped around a furrow portion 59 of the clutch collar 54. When the motion conversion member 106 is not tensioned, there is substantially no contact between the clutch collar 54 and the drum 56. However, when the motion conversion member 106 is sufficiently tensioned, the furrow portion 59 of the clutch collar 54 is compressed into frictional contact with the drum 56 to establish interdependent angular movement therebetween.

FIG. 10 also helps make clear the quick-releasability of the axle 58 and the wheel 52. Although the wheel 52 is normally retained by an axle snap ring 65 on the axle 58, a quick-release button 63 may be pressed to allow a depression of a ball snap 69 thereby to allow the axle 58 to slide from within the axle cylinder 67. Removing the axle 58 from its position within the axle cylinder 67 permits an easy removal of the wheel 52 from the wheel chair 50. Substantially the same motion conversion assembly 100 is again shown in FIG. 10A where the slotted drum sleeve 61 is shown most clearly.

Although, as FIG. 2 shows, the motion conversion member 106 may comprise a cable, FIG. 11 shows that the motion conversion member 106 may be a ribbon-shaped, elongate body. This preferred embodiment includes a lateral step 176 in its body portion 112 so that it may overly the collar 54 and the drum 56 spirally without interfering with its own operation. Alternatively, as FIG. 11A shows, the motion conversion member 106 may comprise two separate motion conversion member sections 106, each fixed to a clutch collar 54 that has a helical channel 57. When opposing tensions are applied to the motion conversion members 106, the channel 57 will tend to close thereby to compress the resilient clutch collar 54 about the drum 56.

Employing a ribbon-shaped motion conversion member 106 may be considered to be particularly advantageous for a number of reasons. For example, the ribbon motion conversion member 106 can undergo turns of a far smaller radius of curvature than most cable motion conversion member's 106. Such an advantage would be useful in confined spaces where the motion conversion member 106 must undergo a significant change in direction as where it overlaps a direction-reversing pulley 162 in FIG. 7, and it would permit drum 56 and clutch collar 54 to be smaller. Also, since one might expect a ribbon-shaped motion conversion member 106 to need to overly clutch collar 54 just once as in FIG. 11 while still providing adequate frictional contact whereas a cable motion conversion member 106 might need to overly the clutch collar 54 a multiplicity of times as in FIG. 10, the change in the length of the effective-travel distance between first reference point 108 and second reference point 110 needed to actuate and deactuate the motion conversion member 106 could be expected to be far less with a ribbon-shaped motion conversion member 106. Also, a ribbon-shaped motion conversion member 106 would overly the clutch collar 54 perpendicularly such that no matter how many times it was wrapped around the clutch collar 54 there would be substantially no lateral communication along the clutch collar 54. Still further, as FIG. 11B shows, the motion conversion member 106 may be somewhat of a hybrid wherein it is a member with a generally flattened-oval cross section. Such a motion conversion member 106 could comprise a plastic sheath 107 with a flattened-oval cross section possibly with a core of one or more reinforcing filaments 109, such as a cable. In such an embodiment, the lateral step 176 needed for ribbon-shaped members 106 may not be necessary. It will be clear that any means of increasing the area of surface contact between the motion conversion member 106 and the clutch collar 54 may be useful for enhancing the frictional coupling between the two when it is desired.

The direction of rotation of the drive wheel 52 when the motion conversion member 106 is tensioned depends on the direction of rotation of the drum 56 which, in turn, is dictated by the direction of reciprocating movement of the motion conversion member 106 and the side from which the motion conversion member 106 overlies the drum 56. With this in mind, one will note that a movement of the force receiver 102 of the motion conversion assembly 100 shown in FIG. 12 in a given direction will impart an opposite direction of rotation than it would in the motion conversion assembly 100 shown in FIG. 2 since the motion conversion member 106 overlies the drum 56 from a side opposite that shown in FIG. 2.

Looking to FIG. 14, one sees that the force receiver 102 may comprise a first section 180 slidably engaged with a second section 182 whereby the length of the force receiver 102 may be adjusted selectively to accommodate different seat heights and preferences of particular occupants. One sees in FIG. 13 that there may be an armrest 178 attached to the wheel chair 50 for supporting a resting arm of an occupant wherein the armrest 178 tends to act as a lever receiving means by its being rotatably connected to the wheel chair 50 for rotation between a lever restraining position shown in FIG. 13 and a lever non-restraining position (not shown). The embodiment of the invention shown in FIG. 14 shows the force receiver 102 pivotally and rotatably connected to the wheel chair 50. A rotational coupling 186 allows the first section 190 of the force receiver 102 to rotate with respect to its second section 182. The force receiver 102 has a forward bend 188 therein between a proximal portion and a distal portion whereby the force receiver 102 acts as an armrest and may be rotated to move the distal portion of the lever 102 to a less obtrusive position relative to an occupant to permit entry and exit by an occupant (not shown).

FIG. 14 also depicts further refinements of the invention. For example, a spine 187 travels along the first section 182 of the force receiver 102 to maintain the shifter mechanism 128 in alignment. Also, a support bumper 190 is provided for supporting the force receiver 102 when the force receiver 102 is employed as an armrest, and a retaining clip 192 retains the force receiver 102 in position. FIG. 14A shows another bent and rotatable force receiver 102 with a rearward bend 188. When rotated to the position shown in FIG. 14A, the force receiver 102 functions as an armrest, but when rotated approximately one hundred and eighty degrees the force receiver 102 is in position to act as a pivotable force receiver 102.

FIG. 15 shows an occupant-propelled vehicle in the form of a bicycle 200. The motion conversion assembly 250 of the bicycle 200 differs from the motion conversion assembly 100 of the occupant-propelled wheel chair 50 most substantially in that the motion conversion assembly 250 of the bicycle 200 is actuated automatically. FIG. 16 shows the motion conversion assembly 250 at the end of a power stroke while FIG. 17 shows the motion conversion assembly 250 at the beginning of a power stroke. Shown in FIG. 16 mounted on a section 204 of the frame 202 of the occupant-propelled vehicle 200 of FIG. 15, the motion conversion assembly 250 automatically adjusts the effective-travel distance between a first end 254 and a second end 256 of the motion conversion member 251 at opposite ends of the power stroke of the force receiving lever 258 of FIG. 16.

The automatically actuating motion conversion assembly 250 includes a trip elastic 260 with a first end 262 attached to the frame section 204, a body portion 264, and a second end 266 slidably connected to a flip member 268. An elongate and flexible stop member 270 has a first end 272 connected to a first end 274 of the flip member 268 and a second end 276 connected to the force receiving lever 258. An engaging trip switch 278 is attached to the vehicle frame section 204 proximal to the first end 262 of the trip elastic 260. A disengaging trip switch 280 is attached to the frame section 204 distal to the first end 262 of the trip elastic 260. The first end 254 of the motion conversion member 251 is attached to a second end 275 of the flip member 268, and the second end 256 of the motion conversion member 251 is drivably coupled to the force receiving lever 258.

A movement of the force receiving lever 258 in a first direction imparts endwise, driven movement to the motion conversion member 251 and the stop member 270 in a first direction thereby stretching the trip elastic 260 and ultimately pulling the flip member 268 into contact with the disengaging trip switch 280 thereby causing the second end 266 of the trip elastic 260 to slide from the second end 275 of the flip member 268 to the first end 275 of the flip member 268 to decrease the effective-travel distance between the first end 254 and the second end 256 of the motion conversion member 251 thereby automatically actuating the motion conversion member 251 to a slackened, disengaged state.

Similarly, a movement of the force receiving lever 258 in a second direction permits the trip elastic 260 to impart endwise movement to the motion conversion member 251 and the stop member 270 in a second direction thereby ultimately pulling the flip member 268 into contact with the engaging trip switch 278 thereby causing the second end 266 of the trip elastic 260 to slide from the first end 274 of the flip member 268 to the second end 275 of the flip member 268 to increase the effective-travel distance between the first end 254 and the second end 256 of the motion conversion member 251 thereby automatically actuating the motion conversion member 251 to a tensioned, engaged state. To illustrate the general applicability of the invention, FIG. 15A shows a similarly numbered automatic motion conversion assembly 250 as it might be seen on a wheel chair 50.

Although the invention has been shown and described with reference to certain preferred embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

I claim as protected by United States Letters Patent:

1. An occupant-propelled vehicle for being propelled by an occupant over an environmental surface, the occupant-propelled vehicle comprising:
   a vehicle body; and a first vehicle propulsion system comprising:
- a first drive wheel rotatably coupled to the vehicle frame for contact with an environmental surface;
- a drum rotatable coupled to the vehicle frame and drivingly engaged with the drive wheel such that a rotation of the drum in a first rotary direction yields a rotation of the drive wheel in a first rotary direction;
- a movable force receiver for receiving an input force from an occupant;
- an elongated and flexible motion conversion member for converting reciprocating motion to rotary motion, the motion conversion member with a first reference point spaced a given effective-travel distance from a second reference point and a body portion between the first reference point and the second reference point overlying the drum, the motion conversion member drivably coupled to the force receiver so that an input force imparting movement to the force receiver imparts endwise, driven movement to the motion conversion member;
- an actuator mechanism operably associated with the motion conversion member for selectively increasing the effective-travel distance between the first reference point and the second reference point thereby actuating the motion conversion member from a slackened, disengaged state wherein there is substantially free movement between the drum and the motion conversion member to a tensioned state wherein there is frictional engagement between the drum and the motion conversion member wherein an input force imparting movement to the force receiver imparts endwise movement to the motion conversion member to impart rotary motion to the drum to impart rotary motion to the drive wheel and thereby to propel the vehicle and wherein a restriction on the movement of the force receiver tends to restrict rotary motion of the drum;
- wherein the force receiver is drivingly coupled to a first connection point and to a second connection point of the motion conversion member wherein the drum is interposed between the first and second connection points whereby an input of force to the force receiver in a first direction imparts an endwise movement to the flexible motion conversion member and, when the motion conversion member is tensioned, imparts rotary motion to the drum and rotary motion to the drive wheel in a first rotary driving direction and an input of force to the force receiver in a second direction imparts an opposite endwise movement to the flexible motion conversion member and, when the motion conversion member is tensioned, imparts rotary motion to the drum in a second rotary driving direction; and
- an elongate and generally rigid drive arm drivably connected to the force receiver at at least one drive point wherein at least one connection point of the flexible motion conversion is drivably and fixedly coupled to the drive arm.

2. The occupant propelled vehicle of claim 1 wherein the drum is drivingly engaged with the drive wheel such that a rotation of the drum in a second rotary direction yields a rotation of the drive wheel in a second rotary direction and a restriction of rotation of the drum yields a restriction of rotation of the drive wheel whereby, when the motion conversion member is actuated to a tensioned state wherein there is frictional engagement between the drum and the motion conversion member, a restriction on the movement of the force receiver tends to restrict rotary motion of the drum to restrict the rotary motion of the drive wheel and thereby to brake the vehicle.

3. The occupant-propelled vehicle of claim 1 wherein the drum is coaxial with the drive wheel.

4. The occupant-propelled vehicle of claim 1 wherein the motion conversion member overlies the drum from a first winding side whereby endwise movement of the motion conversion member in a first reciprocating direction while the motion conversion member is in a tensioned state imparts rotary motion to the drum in the first rotary direction.

5. The occupant-propelled vehicle of claim 1 wherein the motion conversion member overlies the rum from a second winding side whereby endwise movement of the motion conversion member in first reciprocating direction while the motion conversion member is in a tensioned state imparts rotary motion to the drum in a second rotary direction.

6. The occupant-propelled vehicle of claim 1 further comprising a second vehicle propulsion system independent of the first vehicle propulsion system, the second vehicle propulsion system comprising;
- a second drive wheel rotatably coupled to the vehicle frame for contact with an environmental surface,
- a second drum rotatably coupled to the vehicle frame and drivingly engaged with the second drive wheel such that a rotation of the second drum in a first rotary direction yields a rotation of the second drive wheel in a first rotary direction;
- a second movable force receiver for receiving an input force from an occupant;
- a second elongated and flexible motion conversion member for converting reciprocating motion to rotary motion, the second motion conversion member with a first reference point spaced a given effective-travel distance from a second reference point and a body portion between the first reference point and the second reference point overlying the second drum, the second motion conversion member drivably coupled to the second force receiver so that an input force imparting movement to the second force receiver imparts endwise, driven movement to the second motion conversion member; and
- a second actuator mechanism operably associated with the second motion conversion member for selectively increasing the effective-travel distance between the first reference point and the second reference point thereby actuating the second motion conversion member from a slackened, disengaged state wherein there is substantially free movement between the second drum and the second motion conversion member to a tensioned state wherein there is frictional engagement between the second drum and the second motion conversion member wherein an input force imparting movement to the second force receiver imparts endwise movement to the second motion conversion member to impart rotary motion to the second drum to impart rotary motion to the second drive wheel and thereby to propel the vehicle and wherein a restriction on the movement of the second force receiver tends to restrict rotary motion of the second drum; thereby permitting an independent propulsion of the first drive wheel and the second drive wheel to permit propulsion of the vehicle by an effectively simultaneous propulsion of the first drive wheel and the second drive wheel and a selective steering of the vehicle by a differential propulsion of the first drive wheel and the second drive wheel.

7. The occupant-propelled vehicle of claim 1 wherein the actuator mechanism comprises a flexible inner member slidably contained in an outer sheath, the actuator mechanism with an actuated end operably connected to the drive arm and to a connection point of the motion conversion member wherein an actuation of the actuator mechanism slides the inner member toward an actuating end of the actuator mechanism thereby producing relative motion between the drive arm and the connection point of the motion conversion member to increase the distance between the first reference point and the second reference point of the motion conversion member thereby inducing a frictional engagement between the motion conversion member and the drum.

8. The occupant-propelled vehicle of claim 7 wherein the outer sheath is fixedly connected to the drive arm at a termination point of the outer sheath and the inner member of the actuator mechanism extends beyond the termination point to overly a circumferential edge of the drum and then to drivably and fixedly connect to the drive arm such that the inner member is also the motion conversion member.

9. The occupant-propelled vehicle of claim 7 wherein the motion conversion member has a first end reciprocatably and drivably connected to the drive arm and a second end drivably and fixedly connected to the drive arm and the actuated end of the actuator mechanism is operably connected to the first end of the motion conversion member and to the drive arm for producing relative motion therebetween.

10. The occupant-propelled vehicle of claim 9 wherein the outer sheath of the actuator mechanism is fixedly coupled to the drive arm and the inner member is coupled to the first end of the motion conversion member to establishing a reciprocatable and drivable connection of the motion conversion member with the drive arm.

11. The occupant-propelled vehicle of claim 1 wherein the force receiver is a force receiving lever with a length wherein the lever is pivotally connected to the vehicle at a pivot axis whereby an oscillation of the force receiver imparts an endwise, reciprocating movement to the motion conversion member of a given maximum amplitude.

12. The occupant-propelled vehicle of claim 11 wherein the force receiver comprises a first section slidably engaged with a second section whereby the length of the lever may be adjusted selectively.

13. The occupant-propelled vehicle of claim 11 wherein the vehicle body is a wheelchair body with a seat for an occupant supportably retained by the wheelchair body.

14. The occupant-propelled vehicle of claim 11 wherein the drive point of the drive arm is adjustable along at least a part of the length of the lever proximally or distally to the pivot axis by an adjusting means whereby the maximum amplitude of the reciprocating movement may be increased by adjusting the drive point distally away from the pivot axis and the maximum amplitude of the reciprocation movement may be decreased by adjusting the drive point proximally toward the pivot axis.

15. The occupant-propelled vehicle of claim 14 further comprising a selectively operated shifter mechanism adjustably coupling the drive arm to the lever whereby the shifter mechanism effectively controls the drive point of the drive arm.

16. The occupant-propelled vehicle of claim 15 wherein the shifter mechanism comprises a sleeve slidably engaged with the lever, a multiplicity of tip receivers generally aligned along at least a portion of the length of the lever, and a coupler connected to the sleeve with a lever engaging tip retractably biased to engage at least one of the tip receivers whereby the lever engaging tip may be retracted from a given tip receiver to permit a sliding of the sleeve along the lever with a consequent adjustment the drive point of the drive arm.

17. The occupant-propelled vehicle of claim 16 wherein the coupler is tiltable about a fulcrum point whereby a tilting of the coupler pivots the coupler about the fulcrum point to retract the lever engaging tip to permit a sliding of the sleeve.

18. The occupant-propelled vehicle of claim 17 wherein the coupler comprises a rod with a knob matingly connected to a first end of the rod and a hilt for providing a fulcrum point fixed at a point along a length of the rod.

19. The occupant-propelled vehicle of claim 1 further comprising a means for permitting a quick release of the first drive wheel from the vehicle frame.

20. The occupant-propelled vehicle of claim 19 wherein an axle cylinder is rigidly coupled to the vehicle frame and rotatably retains the drum, wherein an axle passes through the axle cylinder and retains the first drive wheel, and further comprising a means for permitting the axle to slide from within the axle cylinder and a means for drivingly engaging the drum with the first drive wheel.

21. The occupant-propelled vehicle of claim 20 wherein the means for permitting the axle to slide from within the axle cylinder comprises a quick-release button operably associated with a compressible ball snap.

22. The occupant-propelled vehicle of claim 20 wherein the means for drivingly engaging the drum with the first drive wheel comprises a slotted drum sleeve extending from the drum and into driving association with the first drive wheel.

23. An occupant-propelled vehicle for being propelled by an occupant over an environmental surface, the occupant-propelled vehicle comprising:
a vehicle body; and
a first vehicle propulsion system comprising:
a first drive wheel rotatably coupled to the vehicle frame for contact with an environmental surface;
a drum rotatably coupled to the vehicle frame and drivingly engaged with the drive wheel such that a rotation of the drum in a first rotary direction yields a rotation of the drive wheel in a first rotary direction;
a movable force receiver for receiving an input force from an occupant;
an elongated and flexible motion conversion member for converting reciprocating motion to rotary motion, the motion conversion member with a first reference point spaced a given effective-travel distance from a second reference point and a body portion between the first reference point and the second reference point overlying the drum, the motion conversion member drivably coupled to the force receiver so that an input force imparting movement to the force receiver imparts endwise, driven movement to the motion conversion member;
an actuator mechanism operably associated with the motion conversion member for selectively increasing the effective-travel distance between the first reference point and the second reference point thereby actuating the motion conversion member from a slackened, disengaged state wherein there is substantially free movement between the drum and the motion conversion member to a tensioned state wherein there is frictional engagement between the drum and the motion conversion member wherein an input force imparting movement to the force receiver imparts endwise movement to the motion conversion member to impart rotary motion to the drum to impart rotary motion to the drive wheel and thereby to propel the vehicle and wherein a restriction on the movement of the force receiver tends to restrict rotary motion of the drum; and a means for biasing the actuator mechanism toward a non-actuated position comprising a clutch collar substantially surrounding the drum and interposed between the drum and the flexible motion conversion member wherein the clutch collar is resiliently compressible about the drum by the actuation of the motion conversion member into a tensioned state by the actuator mechanism.

24. The occupant-propelled vehicle of claim 23 wherein the force receiver is drivingly coupled to a first connection point and to a second connection point of the motion conversion member wherein the drum is interposed between the first and second connection points whereby an input of force to the force receiver in a first direction imparts an endwise movement to the flexible motion conversion member and, when the motion conversion member is tensioned, imparts rotary motion to the drum and rotary motion to the drive wheel in a first rotary driving direction and an input of force to the force receiver in a second direction imparts an opposite endwise movement to the flexible motion conversion member and, when the motion conversion member is tensioned, imparts rotary motion to the drum in a second rotary driving direction.

25. The assembly of claim 23 wherein the clutch collar is supported by an axle cylinder whereby there is substantially no frictional contact between the clutch collar and the drum when the motion conversion member is in a non-tensioned state.

26. The assembly of claim 25 wherein the clutch collar has an outer periphery defining a furrow for supporting the motion conversion member.

27. The assembly of claim 26 wherein the clutch collar has an annular groove for supporting the drive arm.

28. The assembly of claim 23 further comprising a friction contact surface disposed on an inner surface of the clutch collar.

29. The assembly of claim 23 further comprising a friction contact surface disposed on an outer surface of the clutch collar.

* * * * *